(12) United States Patent  
Suga et al.

(10) Patent No.: US 11,533,790 B2  
(45) Date of Patent: Dec. 20, 2022

(54) INDUCTION COOKER

(71) Applicant: Mitsubishi Electric Corporation, Tokyo (JP)

(72) Inventors: Ikuro Suga, Tokyo (JP); Hayato Yoshino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 508 days.

(21) Appl. No.: 16/647,105

(22) PCT Filed: Oct. 12, 2017

(86) PCT No.: PCT/JP2017/037009  
§ 371 (c)(1),  
(2) Date: Mar. 13, 2020

(87) PCT Pub. No.: WO2019/073574  
PCT Pub. Date: Apr. 18, 2019

(65) Prior Publication Data  
US 2020/0214091 A1 Jul. 2, 2020

(51) Int. Cl.  
*H02J 50/12* (2016.01)  
*H05B 6/12* (2006.01)  
(Continued)

(52) U.S. Cl.  
CPC ........... *H05B 6/1236* (2013.01); *F24C 7/083* (2013.01); *H02J 50/005* (2020.01); *H02J 50/12* (2016.02);  
(Continued)

(58) Field of Classification Search  
CPC ....... F24C 7/083; H02J 50/005; H02J 50/402; H02J 50/80; H02J 50/40; H02J 50/12;  
(Continued)

(56) References Cited

U.S. PATENT DOCUMENTS

2012/0212069 A1   8/2012  Kawano et al.  
2015/0245416 A1*  8/2015  Yoshino ................. H05B 6/062  
                                                     99/358  
(Continued)

FOREIGN PATENT DOCUMENTS

JP   2005-093122 A   4/2005  
JP   2009-130416 A   6/2009  
(Continued)

OTHER PUBLICATIONS

International Search Report of the International Searching Authority dated Dec. 12, 2017 for the corresponding International application No. PCT/JP2017/037009 (and English translation).

*Primary Examiner* — Quan Tra  
(74) *Attorney, Agent, or Firm* — Posz Law Group, PLC

(57) ABSTRACT

An induction cooker according to the present disclosure includes a body including a top plate on which a heating target is placed, a frame formed to surround an outer periphery of the top plate, and having a discontinuous portion being electrically discontinuous from other parts of the frame, a heating coil disposed below the top plate, and configured to inductively heat the heating target, a driver circuit configured to supply electric power to the heating coil, a power transfer coil configured to transfer electric power by magnetic resonance, and a power transfer circuit configured to supply electric power to the power transfer coil, and a power receiving device including a power receiving coil configured to receive electric power from the power transfer coil by magnetic resonance, and a load circuit configured to operate by the electric power received by the power receiving coil.

20 Claims, 16 Drawing Sheets

(51) Int. Cl.
  *H02J 50/80* (2016.01)
  *H02J 50/40* (2016.01)
  *H02J 50/00* (2016.01)
  *F24C 7/08* (2006.01)
  *H05B 6/06* (2006.01)

(52) U.S. Cl.
  CPC .............. *H02J 50/40* (2016.02); *H02J 50/80* (2016.02); *H05B 6/062* (2013.01); *H05B 6/1209* (2013.01); *H05B 2213/06* (2013.01); *H05B 2213/07* (2013.01)

(58) Field of Classification Search
  CPC .... H05B 6/062; H05B 6/1236; H05B 6/1209; H05B 2213/07; H05B 2213/06; Y02B 40/00
  See application file for complete search history.

(56) References Cited

U.S. PATENT DOCUMENTS

| | | | |
|---|---|---|---|
| 2017/0155283 A1* | 6/2017 | Akuzawa | H02J 50/12 |
| 2017/0256989 A1 | 9/2017 | Yoshii | |
| 2019/0003716 A1* | 1/2019 | Je | B21D 53/74 |
| 2020/0084842 A1* | 3/2020 | Yoshino | H05B 6/062 |

FOREIGN PATENT DOCUMENTS

| | | |
|---|---|---|
| JP | 2010-049959 A | 3/2010 |
| JP | 2014-041753 A | 3/2014 |
| JP | 5738497 B1 | 6/2015 |
| JP | 5838562 B2 | 1/2016 |
| JP | 2017-110905 A | 6/2017 |
| JP | 2017-117607 A | 6/2017 |
| JP | 2017-158012 A | 9/2017 |
| WO | 2016/035141 A1 | 3/2016 |

\* cited by examiner

INDUCTION COOKER

CROSS REFERENCE TO RELATED APPLICATION

This application is a U.S. national stage application of PCT/JP2017/037009 filed on Oct. 12, 2017, the contents of which are incorporated herein by reference.

TECHNICAL FIELD

The present disclosure relates to an induction cooker configured to perform magnetic-resonance non-contact power transfer.

BACKGROUND ART

There is proposed a related-art induction cooker including a temperature detection unit to be placed on a top plate (see, for example, Patent Literature 1). The induction cooker includes a first coil disposed below the top plate, and a second coil provided in the temperature detection unit. When the second coil is disposed to face the first coil, the first coil and the second coil are coupled by electromagnetic induction coupling. Thus, electric power is supplied from the first coil to the second coil.

There is also proposed a related-art wireless power transfer system configured to transfer electric power by using magnetic field resonance between a power transfer coil and a power receiving coil (see, for example, Patent Literature 2). In the magnetic field resonance system, resonance circuits each using a coil and a capacitor are provided both in a power transfer device and in a power receiving device and the resonance frequencies of the resonance circuits are matched. Thus, electric power is transferred from the power transfer device to the power receiving device. Wireless power transfer using the magnetic field resonance system has an advantage in that electric power can be transferred with high efficiency even if the power transfer device and the power receiving device are located away from each other at some distance. Note that the magnetic field resonance is referred to also as magnetic resonance.

CITATION LIST

Patent Literature

Patent Literature 1: Japanese Unexamined Patent Application Publication No. 2010-49959
Patent Literature 2: Japanese Patent No. 5838562

SUMMARY OF DISCLOSURE

Technical Problem

In the induction cooker described in Patent Literature 1, electric power is supplied by electromagnetic induction coupling. Therefore, it is necessary that the first coil serving as a power transfer coil for power supply and the second coil provided in the temperature detection unit and serving as a power receiving coil be disposed to face each other. As a result, a problem arises in that the placement position of the power receiving device is restricted.

In the power transfer using the magnetic field resonance system as in the wireless power transfer system described in Patent Literature 2, on the other hand, the distance between the power transfer coil and the power receiving coil can be increased compared with that in the electromagnetic induction-coupling power transfer. Thus, the restriction of the placement position of the power receiving device can be suppressed.

However, the following problem arises when the magnetic resonance system is applied to non-contact power transfer from a body of the induction cooker to the power receiving device. That is, the induction cooker includes a top plate on which a heating target is placed, and a frame formed to surround the outer periphery of the top plate. The top plate is made of a non-magnetic material such as glass. The frame is made of a conductive material such as stainless steel. Therefore, when an induction field generated by the power transfer coil is linked to the frame, an induced current flows through a closed circuit that runs along the frame surrounding the outer periphery of the top plate. As a result, a problem arises in that the supplied electric power attenuates.

The induction cooker of the present disclosure has been made to overcome the problem described above and therefore aims to provide an induction cooker configured such that electric power is transferred from a body to a power receiving device by magnetic resonance and attenuation of supplied electric power can be suppressed.

Solution to Problem

An induction cooker according to an embodiment of the present disclosure includes a body including a top plate on which a heating target is placed, a frame formed to surround an outer periphery of the top plate, and having a discontinuous portion being electrically discontinuous from other parts of the frame, a heating coil disposed below the top plate, and configured to inductively heat the heating target, a driver circuit configured to supply electric power to the heating coil, a power transfer coil configured to transfer electric power by magnetic resonance, and a power transfer circuit configured to supply electric power to the power transfer coil, and a power receiving device including a power receiving coil configured to receive electric power from the power transfer coil by magnetic resonance, and a load circuit configured to operate by the electric power received by the power receiving coil.

Advantageous Effects of Disclosure

In the induction cooker according to the embodiment of the present disclosure, the frame formed to surround the outer periphery of the top plate has the discontinuous portion being electrically discontinuous from other parts of the frame. Therefore, the induced current that may circulate along the frame is not generated. Thus, attenuation of supplied electric power can be suppressed.

DESCRIPTION OF EMBODIMENTS

Embodiment 1

(Structures)

Figure 1:
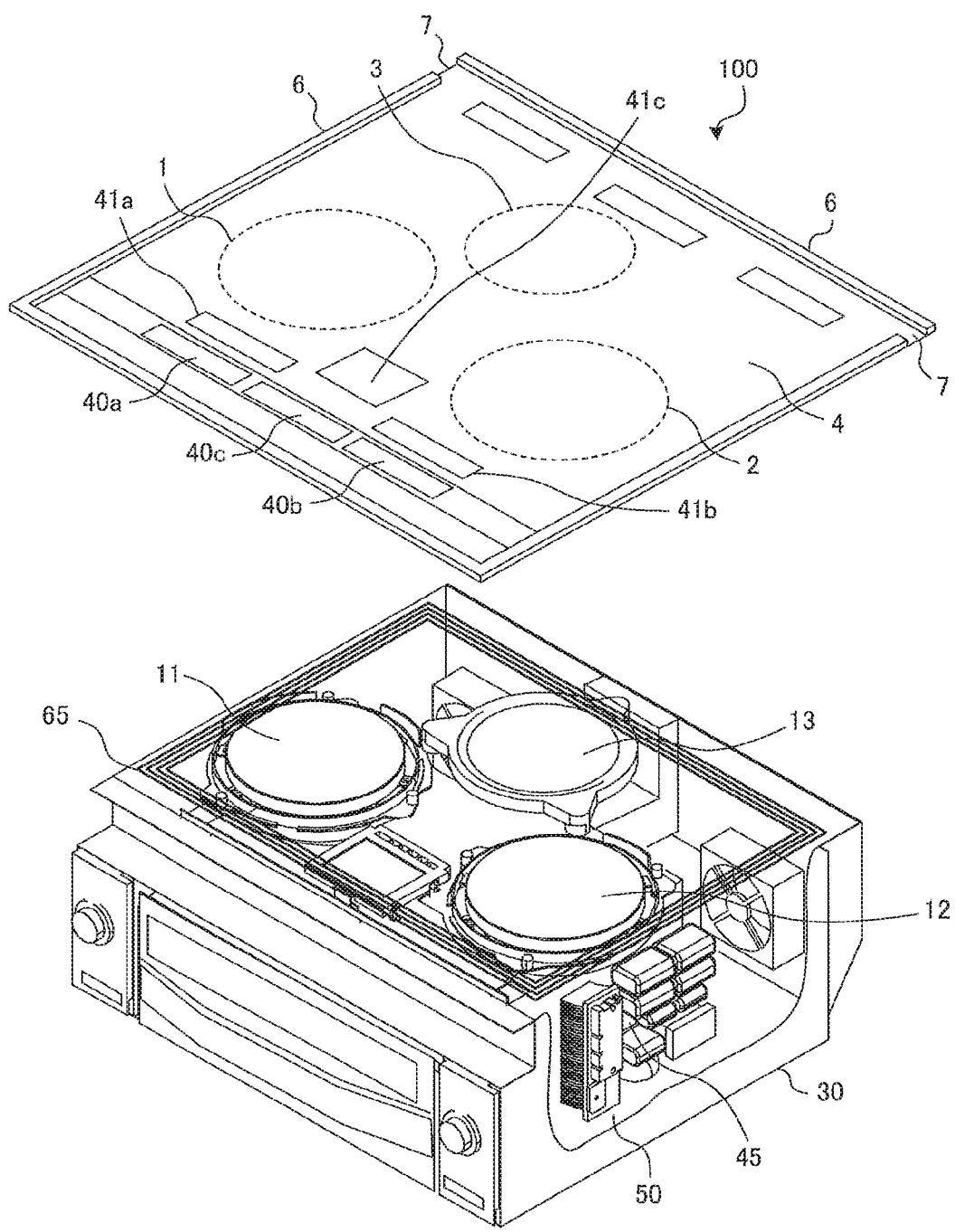
FIG. 1 is an exploded perspective view illustrating a body of an induction cooker according to Embodiment 1.

FIG. 1 is an exploded perspective view illustrating a body of an induction cooker according to Embodiment 1.

Figure 2:
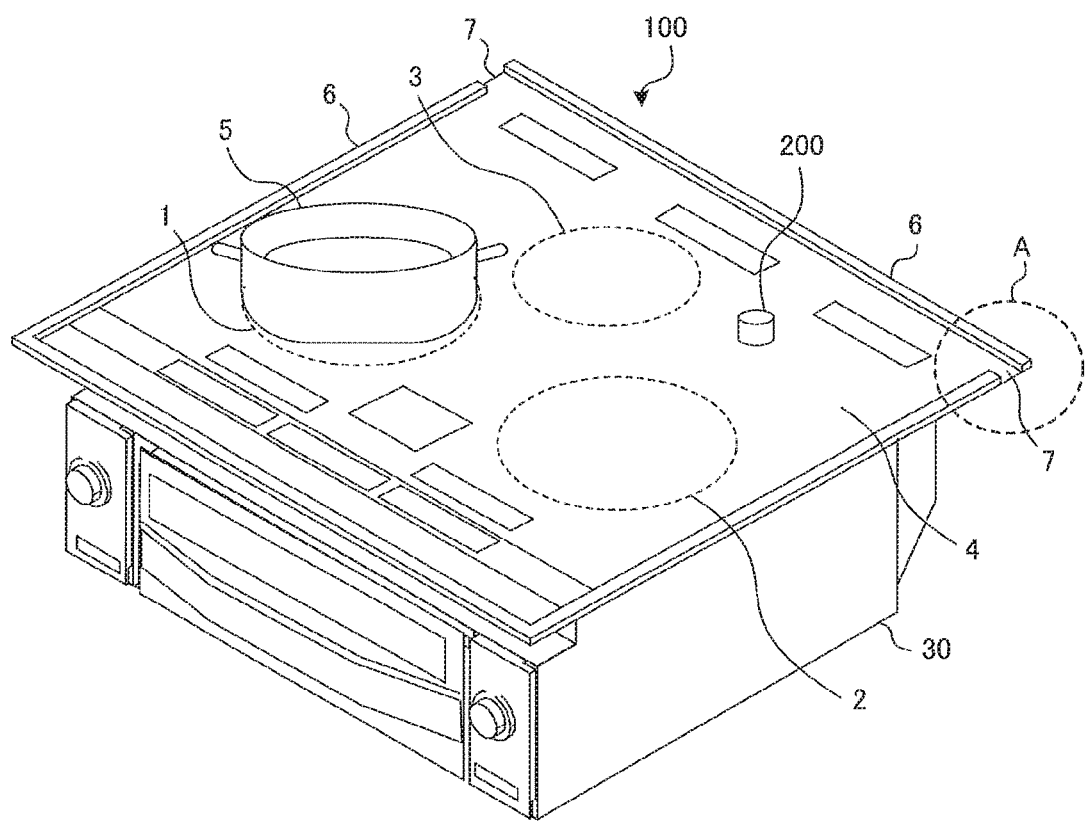
FIG. 2 is a perspective view illustrating the body of the induction cooker and a power receiving device according to Embodiment 1.

FIG. 2 is a perspective view illustrating the body of the induction cooker and a power receiving device according to Embodiment 1.

Figure 3:
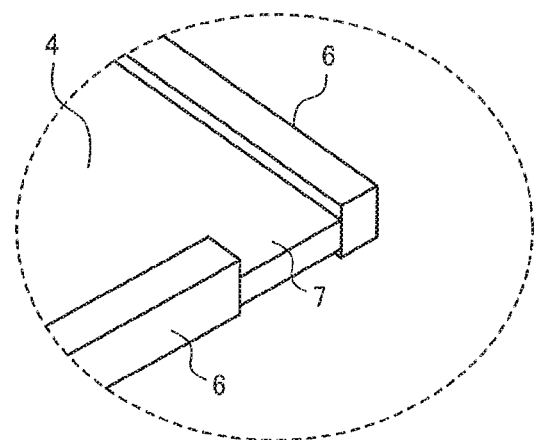
FIG. 3 is an enlarged view of a part A in FIG. 2.

FIG. 3 is an enlarged view of a part A in FIG. 2.

As illustrated in FIG. 1 to FIG. 3, a body 100 of the induction cooker includes a rectangular top plate 4 on which a heating target 5 such as a pot is placed, and a casing 30 provided below the top plate 4. A power receiving device 200 to which electric power is transferred from the body 100 is removably placed on the top plate 4. In the induction cooker according to Embodiment 1, the power receiving device 200 includes a temperature sensor configured to detect the temperature of the heating target 5. Details are described later.

The top plate 4 of the body 100 has a first heating port 1, a second heating port 2, and a third heating port 3 as heating ports configured to inductively heat the heating target 5. The casing 30 below the top plate 4 includes a first heating unit 11, a second heating unit 12, and a third heating unit 13 in relation to the respective heating ports. In the body 100, the heating target 5 can be placed and inductively heated at each heating port.

In Embodiment 1, the first heating unit 11 and the second heating unit 12 are provided side by side at the front of the body 100 and the third heating unit 13 is provided substantially at the center of the rear of the body 100. Note that the disposition of the heating ports is not limited thereto. For example, the three heating ports may be disposed side by side substantially in line. Further, the heating ports may be disposed so that the center of the first heating unit 11 and the center of the second heating unit 12 are offset in a fore-and-aft direction. Further, the number of heating ports is not limited to three but may be one, two, four, or more.

The top plate 4 is made of a material such as heat-proof tempered glass, crystallized glass, or borosilicate glass, through which infrared rays may pass. Further, the top plate 4 is made of a non-magnetic material. The top plate 4 is fixed in a water-tight condition via rubber packing or a sealer interposed between the top plate 4 and the outer periphery of a top opening of the body 100. On the top plate 4, circular pot position indicators showing general placement positions of pots are formed by painting, printing, or other methods in relation to the respective heating ports serving as heating ranges of the first heating unit 11, the second heating unit 12, and the third heating unit 13.

Further, the top plate 4 has a frame 6 formed to surround the outer periphery of the top plate 4. The frame 6 is made of a conductive material such as stainless steel. The frame 6 functions as a reinforcement that increases the strength of the top plate 4.

The frame 6 has gaps 7 at parts of the outer periphery of the top plate 4. That is, the gap 7 is a portion without the frame 6 on the outer periphery of the top plate 4. The gap 7 is a discontinuous portion where a part of the outer periphery of the top plate 4 surrounded by the frame 6 has electrical discontinuity from the other parts of the frame 6.

Note that FIG. 1 and FIG. 2 illustrate a case where two gaps 7 are provided at the rear ends of the body 100 but the present disclosure is not limited thereto. At least one gap 7 may be provided at an arbitrary position on the outer periphery of the top plate 4.

At the front of the top plate 4, an operation unit 40a, an operation unit 40b, and an operation unit 40c are provided as input devices configured to set cooking menus and input power for heating the heating target 5 by the first heating unit 11, the second heating unit 12, and the third heating unit 13. The operation unit 40a, the operation unit 40b, and the operation unit 40c may hereinafter be referred to collectively as operation units 40.

Further, a display unit 41a, a display unit 41b, and a display unit 41c configured to display an operating condition of the body 100, input operation details from the operation units 40, and other information are provided near the operation units 40. The display unit 41a, the display unit 41b, and the display unit 41c may hereinafter be referred to collectively as display units 41.

Note that the operation units 40a to 40c and the display units 41a to 41c are not particularly limited as in a case where the operation units 40a to 40c and the display units 41a to 41c are provided for the respective heating ports or a case where one operation unit 40 and one display unit 41 are provided collectively for the respective heating ports. Note that each of the operation units 40a to 40c includes mechanical switches such as push-switches or tact switches, or a touch switch configured to detect an input operation through a change in capacitance of an electrode. Further, each of the display units 41a to 41c is, for example, a liquid crystal device (LCD) or a light emitting diode (LED).

Note that the following description is directed to a case where an operation display unit 43 is provided by combining the operation unit 40 and the display unit 41. For example, the operation display unit 43 is a touch panel having a touch switch disposed on top of an LCD.

The body 100 includes the first heating unit 11, the second heating unit 12, and the third heating unit 13 below the top plate 4 and the heating units are heating coils. Note that at least one of the first heating unit 11, the second heating unit 12, and the third heating unit 13 may be, for example, an electric heater of a radiation heating type.

The heating coil is formed by winding a conductive wire made of an arbitrary metal coated to have insulation. Examples of the material for the conductive wire include copper and aluminum. Each heating coil generates a high-frequency magnetic field with high-frequency power supplied to the heating coil by a driver circuit 50.

The body 100 of the induction cooker includes the driver circuit 50 configured to supply high-frequency power to the heating coils of the first heating unit 11, the second heating unit 12, and the third heating unit 13, and a controller 45 configured to control the overall operation of the induction cooker including the driver circuit 50.

A power transfer coil 65 is provided below the top plate 4 of the body 100 to transfer electric power to the power receiving device 200 by magnetic resonance. The power transfer coil 65 is formed by winding a conductive wire made of an arbitrary metal coated to have insulation. Examples of the conductive wire include copper and aluminum. The power transfer coil 65 has a smaller inductance than the heating coil.

As illustrated in FIG. 1, the power transfer coil 65 is, for example, disposed along the edge of the top plate 4. Further, the power transfer coil 65 is provided to surround the first heating unit 11, the second heating unit 12, and the third heating unit 13 in plan view. Thus, one power transfer coil 65 can be disposed in a wider range in an area without the heating units on the top plate 4.

Note that the shape and disposition of the power transfer coil 65 are not limited to those described above. For example, the power transfer coil 65 may be provided to surround one heating unit in plan view. Further, a plurality of power transfer coils 65 may be provided. Further, the shape of the power transfer coil 65 may be a circular shape or an elliptical shape.

Figure 4:
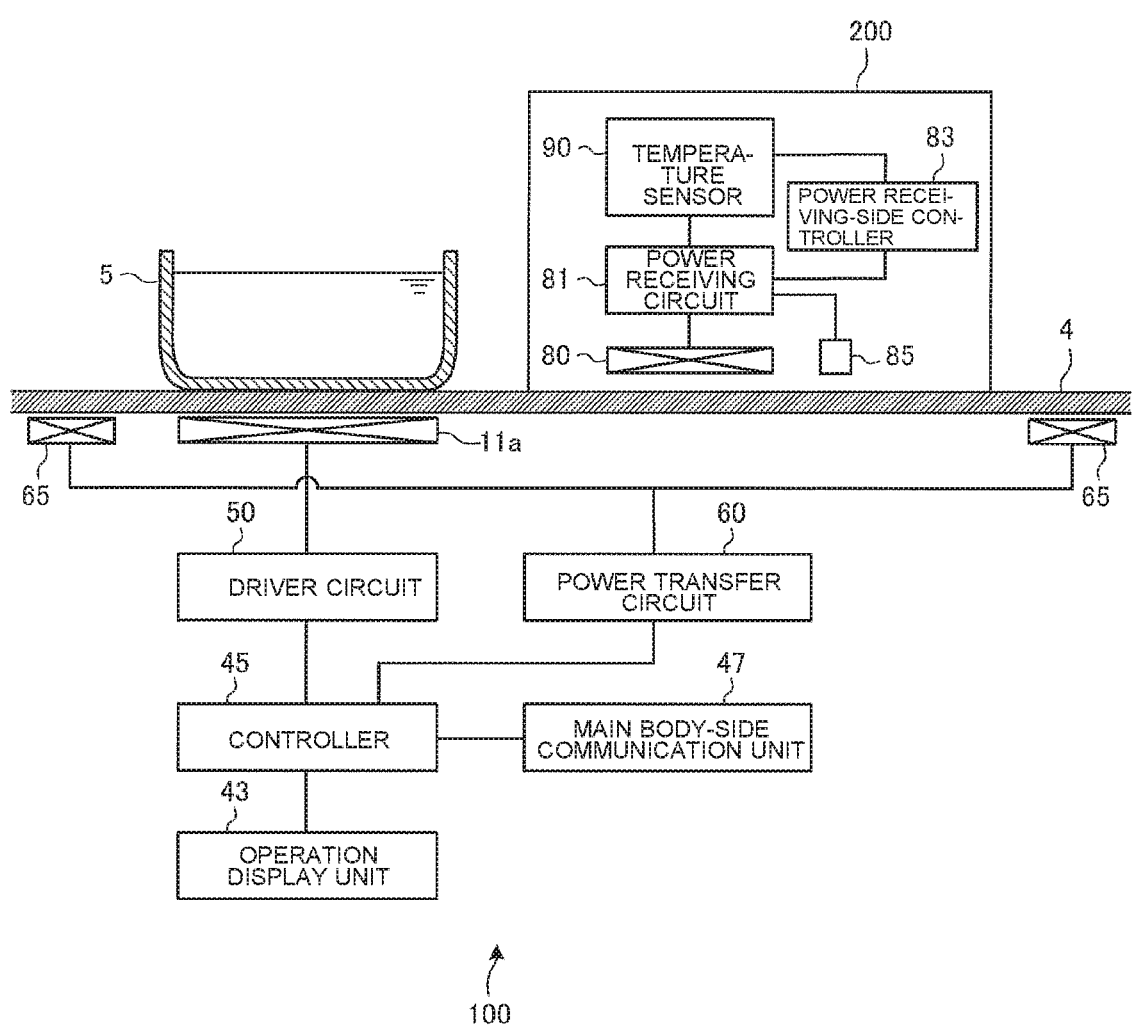
FIG. 4 is a block diagram illustrating the structures of the body of the induction cooker and the power receiving device according to Embodiment 1.

FIG. 4 is a block diagram illustrating the structures of the body of the induction cooker and the power receiving device according to Embodiment 1.

FIG. 4 illustrates a state in which the heating target 5 is placed at a heating port on the top plate 4 of the body 100 of the induction cooker and the power receiving device 200 is placed in an area other than that of the heating port of the top plate 4.

A non-contact power transfer system includes the power receiving device 200, and the body 100 of the induction cooker that functions as a non-contact power transfer device.

As illustrated in FIG. 4, a heating coil 11a, the operation display unit 43, the controller 45, a main body-side communication unit 47, the driver circuit 50, a power transfer circuit 60, and the power transfer coil 65 are disposed in the body 100 of the induction cooker.

The controller 45 is a microcomputer or a digital signal processor (DSP). The controller 45 controls the driver circuit 50 based on operation details from the operation display unit 43 and communication information received from the main body-side communication unit 47. Further, the controller 45 displays information on the operation display unit 43 depending on, for example, an operating condition.

The main body-side communication unit 47 is a wireless communication interface conforming to an arbitrary communication standard such as a wireless LAN, Bluetooth (registered trademark), infrared communication, or near field communication (NFC). The main body-side communication unit 47 performs wireless communication with a power receiving-side communication device 85 of the power receiving device 200.

The power transfer circuit 60 supplies electric power to the power transfer coil 65. Details are described later.

For example, the power receiving device 200 is placed on the top plate 4 and receives electric power from the body 100 without contact. The power receiving device 200 includes a power receiving coil 80, a power receiving circuit 81, a power receiving-side controller 83, the power receiving-side communication device 85, and a temperature sensor 90, which is a load circuit.

The power receiving coil 80 receives electric power from the power transfer coil 65 by magnetic resonance. The power receiving circuit 81 supplies loads with the electric power received by the power receiving coil 80. Details are described later.

The power receiving-side controller 83, the power receiving-side communication device 85, and the temperature sensor 90 operate by the electric power supplied from the power receiving circuit 81.

For example, the temperature sensor 90 is an infrared sensor and detects, without contact, a temperature on the side of the heating target 5 placed on the top plate 4. Note that the temperature sensor 90 may be a contact sensor such as a thermistor. The temperature sensor 90 outputs a voltage signal corresponding to the detected temperature to the power receiving-side controller 83.

The power receiving-side controller 83 is a microcomputer or a DSP. The power receiving-side controller 83 causes the power receiving-side communication device 85 to transmit information on the temperature detected by the temperature sensor 90.

The power receiving-side communication device 85 is a wireless communication interface conforming to the communication standard of the main body-side communication unit 47. The power receiving-side communication device 85 performs wireless communication with the main body-side communication unit 47.

Note that the temperature sensor 90 of Embodiment 1 serves as the load circuit.

The power receiving-side communication device 85 of Embodiment 1 corresponds to a first communication device.

The main body-side communication unit 47 of Embodiment 1 corresponds to a second communication device.

(Driver Circuit)

Figure 5:
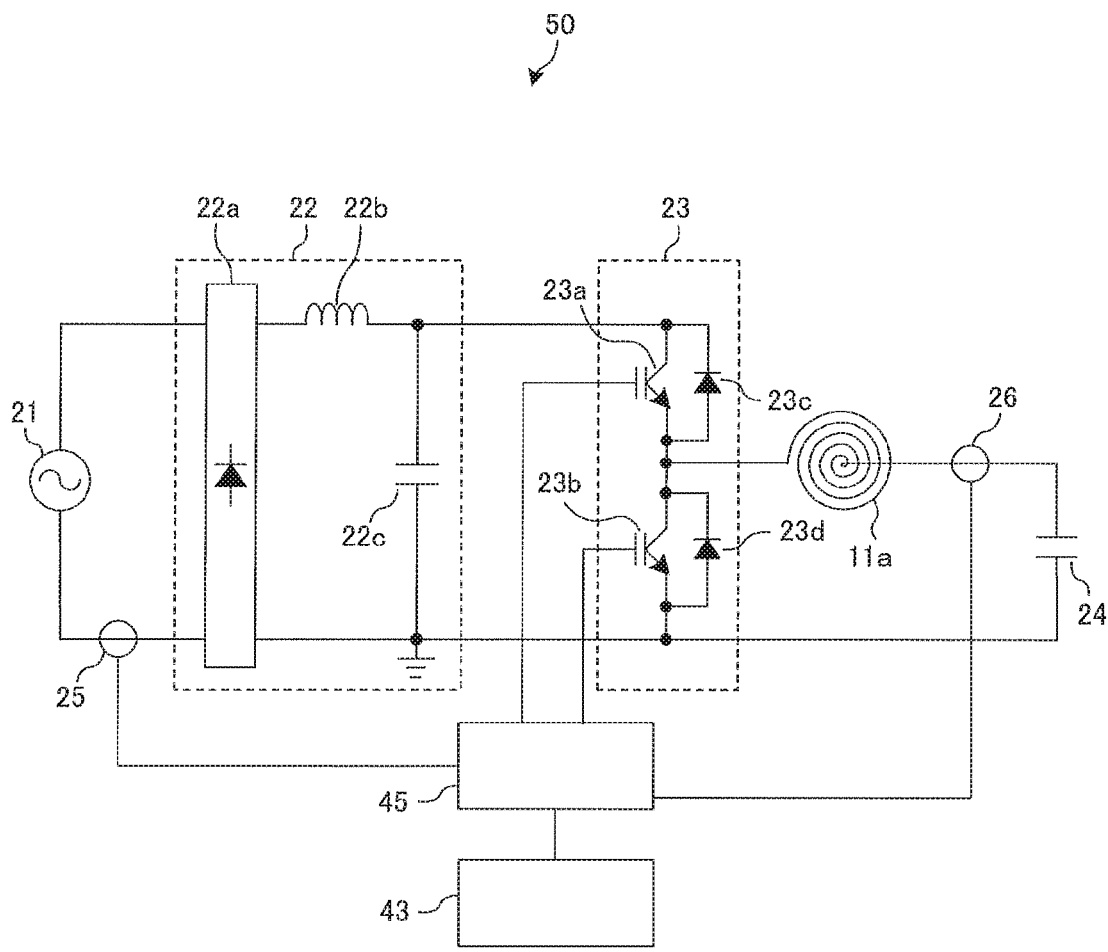
FIG. 5 is a diagram illustrating a driver circuit of the induction cooker according to Embodiment 1.

FIG. 5 is a diagram illustrating the driver circuit of the induction cooker according to Embodiment 1., Note that driver circuits 50 are provided for the respective heating units but their circuit structures may be identical or may be varied for the respective heating units. FIG. 5 illustrates one driver circuit 50 alone. As illustrated in FIG. 5, the driver circuit 50 includes a DC power circuit 22, an inverter circuit 23, and a resonant capacitor 24.

For example, an input current detection unit 25 is a current sensor, which detects a current input from an AC power source 21 to the DC power circuit 22 and outputs a voltage signal corresponding to an input current value to the controller 45.

The DC power circuit 22 includes a diode bridge 22a, a reactor 22b, and a smoothing capacitor 22c. The DC power circuit 22 converts an AC voltage input from the AC power source 21 into a DC voltage and outputs the DC voltage to the inverter circuit 23.

The inverter circuit 23 is a so-called half-bridge inverter, in which an IGBT 23a and an IGBT 23b serving as switching elements are connected in series to an output of the DC power circuit 22. In the inverter circuit 23, a diode 23c serving as a freewheeling diode is connected in parallel to the IGBT 23aFurther, in the inverter circuit 23, a diode 23d serving as a freewheeling diode is connected in parallel to the IGBT 23b.

The IGBT 23a and the IGBT 23b are driven ON and OFF by a drive signal output from the controller 45. The controller 45 outputs a drive signal for alternately turning ON and OFF the IGBT 23a and the IGBT 23b in such a manner that the IGBT 23b is OFF when the IGBT 23a is ON, and the IGBT 23b is ON when the IGBT 23a is OFF. Thus, the inverter circuit 23 converts DC power output from the DC power circuit 22 into AC power having a normal frequency and supplies the electric power to a resonance circuit including the heating coil 11a and the resonant capacitor 24. Note that the AC power having the normal frequency is AC power having a high frequency of, for example, 20 kHz or higher and lower than 100 kHz.

The resonant capacitor 24 is connected in series to the heating coil 11a, The resonance circuit has a resonance frequency depending on, for example, an inductance of the heating coil 11a and a capacitance of the resonant capacitor 24. Note that the inductance of the heating coil 11a changes depending on properties of a metal load at the time of magnetic coupling of the heating target 5 that is the metal load and the resonance frequency of the resonance circuit changes depending on the change in the inductance.

With this structure of the driver circuit 50, a high-frequency current of about several tens of amperes flows through the heating coil 11a and the heating target 5 placed on the top plate 4 immediately above the heating coil 11a is inductively heated by high-frequency magnetic fluxes generated by the flowing high-frequency current.

Note that the IGBT 23a and the IGBT 23b serving as the switching elements are, for example, silicon-based semiconductors but the present disclosure is not limited thereto. The switching element may be a wide-band gap semiconductor made of a silicon carbide-based or gallium nitride-based material. When the wide-band gap semiconductor is used as the switching element, an energization loss of the switching element can be reduced. Further, heat radiation of the driver circuit 50 is satisfactory even if a switching frequency for driving the switching element is increased. Therefore, a radiator fin of the driver circuit 50 can be downsized. Thus, the driver circuit 50 can be downsized and costs can be reduced.

A coil current detection unit 26 is connected to the resonance circuit including the heating coil 11 a and the resonant capacitor 24. For example, the coil current detection unit 26 is a current sensor, which detects a current flowing through the heating coil 11a and outputs a voltage signal corresponding to a coil current value to the controller 45.

Note that FIG. 5 illustrates the half-bridge driver circuit but the driver circuit may be a full-bridge driver circuit including four IGBTs and four diodes.

(Magnetic-Resonance Power Transfer)

Figure 6:
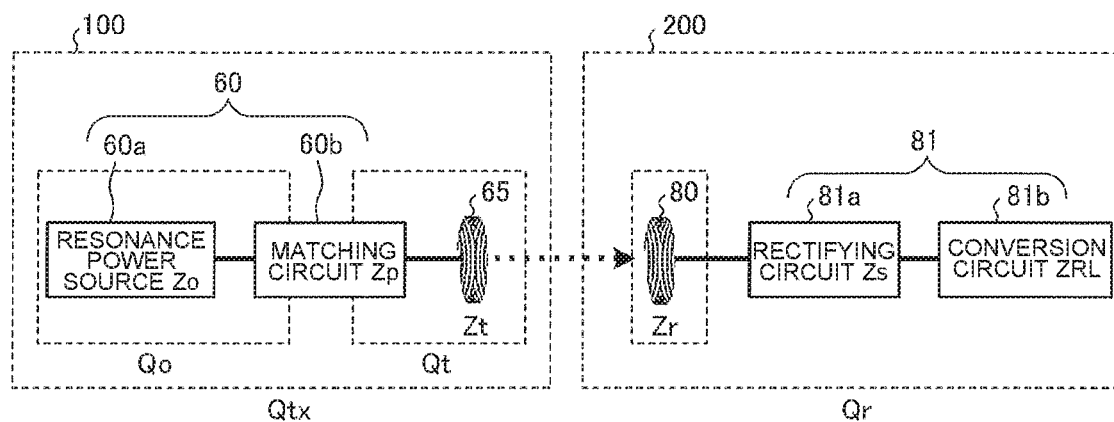
FIG. 6 is a diagram illustrating the structures of the body of the induction cooker and the power receiving device according to Embodiment 1.
Figure 7:
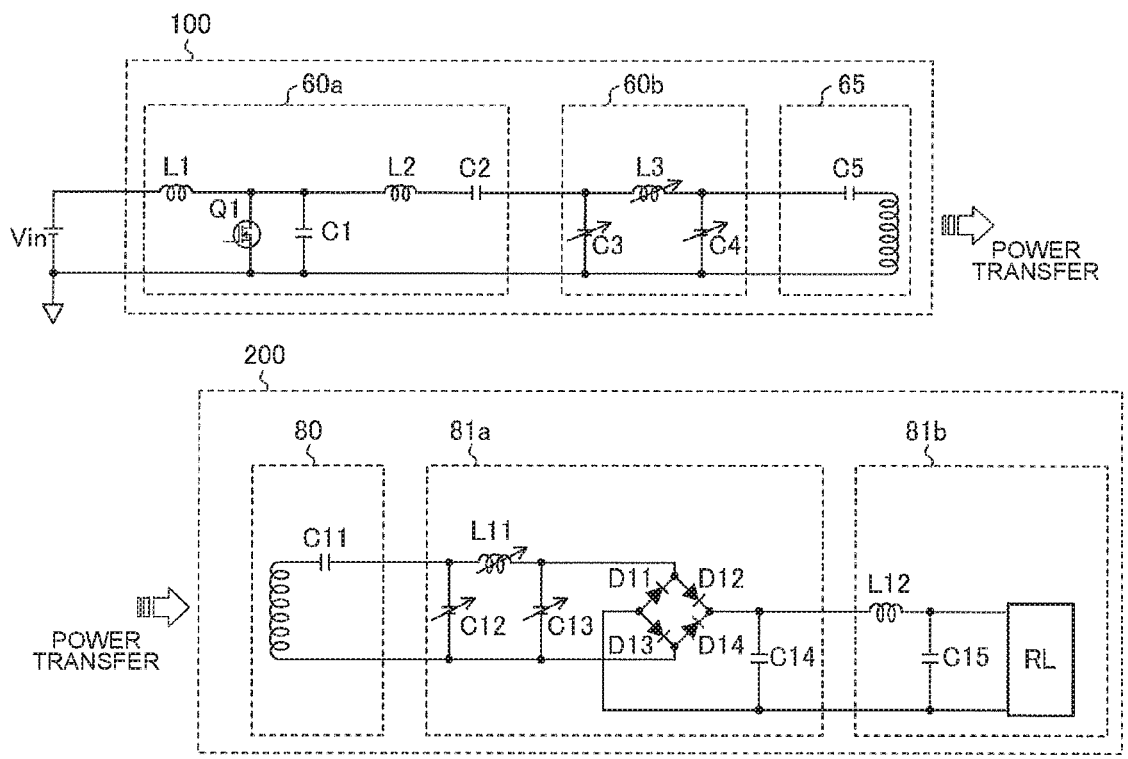
FIG. 7 is a specific circuit diagram of the structures in FIG. 6.

FIG. 6 is a diagram illustrating the structures of the body of the induction cooker and the power receiving device according to Embodiment 1, FIG. 7 is a specific circuit diagram of the structures in FIG. 6.

Note that FIG. 6 and FIG. 7 illustrate the structures of the body 100 of the induction cooker and the power receiving device 200 that are related to magnetic-resonance power transfer.

The body 100 of the induction cooker and the power receiving device 200 constitute a magnetic-resonance non-contact power transfer system configured to transfer electric power by using a resonance characteristic. That is, the body 100 of the induction cooker is a resonant power transfer device configured to transfer electric power to the power receiving device 200 by magnetic resonance. Further, the power receiving device 200 is a resonant power receiving device configured to receive electric power from the body 100 by magnetic resonance. Note that the magnetic-resonance power transfer is referred to also as resonant-coupling power transfer.

As illustrated in FIG. 6 and FIG. 7, the power transfer circuit 60 of the body 100 includes a resonance power source 60a and a matching circuit 60b.

The resonance power source 60a controls power supply to the power transfer coil 65. The resonance power source 60a converts input DC or AC power into AC power having a predetermined frequency and outputs the AC power. The resonance power source 60a is a resonant-switching power circuit having an output impedance Zo, a resonance frequency fo, and a resonance characteristic value Qo.

Further, the resonance frequency fo of the resonance power source 60a is set to a frequency in a megahertz band. For example, the resonance frequency fo is 6.78 MHz. Note that the resonance frequency fo is not limited thereto and may be a frequency that is an integral multiple of 6.78 MHz in the megahertz band.

The matching circuit 60b performs impedance matching between the output impedance Zo of the resonance power source 60a and a bandpass characteristic impedance Zt of the power transfer coil 65. The matching circuit 60b is are or L filter including an inductor L and a capacitor C and has a bandpass characteristic impedance Zp.

The power transfer coil 65 transfers electric power to the power receiving coil 80 of the power receiving device 200 by receiving the AC power input from the resonance power source 60a via the matching circuit 60b and performs a resonance operation to generate a non-radiative electromagnetic field around the power transfer coil 65. The power transfer coil 65 has a resonance circuit formed by a coil and a capacitor C5 to function as a resonant antenna. The power transfer coil 65 has the bandpass characteristic impedance Zt, a resonance frequency ft, and a resonance characteristic value Qt.

Further, the resonance frequency fo and the resonance characteristic value Qo of the resonance power source 60a are determined based on the output impedance Zo of the resonance power source 60a and the bandpass characteristic impedance Zp of the matching circuit 60b. The resonance frequency ft and the resonance characteristic value Qt of the power transfer coil 65 are determined based on the bandpass characteristic impedance Zt of the power transfer coil 65 and the bandpass characteristic impedance Zp of the matching circuit 60b.

Further, the body 100 of the induction cooker has a resonance characteristic value Qtx of Expression (1) based on the two resonance characteristic values Qo and Qt.

[Math. 1]

$$Qtx=\sqrt{(Qo \cdot Qt)} \quad (1)$$

The power receiving circuit 81 of the power receiving device 200 includes a rectifying circuit 81a and a conversion circuit 81b.

The power receiving coil 80 receives electric power and outputs AC power by performing an operation of resonant coupling to the non-radiative electromagnetic field generated by the power transfer coil 65. The power receiving coil 80 has a resonance circuit formed by a coil and a capacitor C11 to function as a resonant antenna. The power receiving coil 80 has a bandpass characteristic impedance Zr The rectifying circuit 81a is a matching-type rectifying circuit having a rectifying function for converting the AC power from the power receiving coil 80 into DC power, and a matching function for performing impedance matching between the bandpass characteristic impedance Zr of the power receiving coil 80 and an input impedance ZRL of the conversion circuit 81b. The matching function is implemented by a π or L filter including an inductor L and a capacitor C. Further, the rectifying circuit 81a has a bandpass characteristic impedance Zs. Note that the rectifying circuit 81a herein has the rectifying function and the matching function but is not limited thereto. The rectifying circuit 81a may have only the rectifying function though the rectifying efficiency decreases.

The conversion circuit 81b receives the DC power input from the rectifying circuit 81a, converts the DC power into a predetermined voltage, and supplies the voltage to, for example, the temperature sensor 90, which is the load circuit. The conversion circuit 81b includes an LC filter configured to smooth out a high-frequency voltage ripple, and a DC/DC converter configured to convert the DC power into the predetermined voltage. The conversion circuit 81b has the input impedance ZRL. Note that the conversion circuit 81b may include only the LC filter serving as a smoothing filter without the DC/DC converter, Further, a resonance characteristic value Qr and a resonance frequency fr of the power receiving device 200 are determined based on the bandpass characteristic impedance Zr of the power receiving coil 80, the bandpass characteristic impedance Zs of the rectifying circuit 81a, and the input impedance ZRL of the conversion circuit 81b.

Further, the characteristic impedances of the functional units are set so that a correlation is provided among the resonance characteristic value Qo of the resonance power source 60a, the resonance characteristic value Qt of the power transfer coil 65, and the resonance characteristic value Qr of the power receiving device 200. That is, the resonance characteristic value Qtx of the body 100 (=$\sqrt{(Qo \cdot Qt)}$) and the resonance characteristic value Qr of the power receiving device 200 are made closer to each other (Expression (2)).

Specifically, a range defined by Expression (3) is desirably satisfied.

[Math. 2]

$$\sqrt{(Qo \cdot Qt)} \approx Qr \quad (2)$$

[Math. 3]

$$0.5Qr \leq \sqrt{(Qo \cdot Qt)} \leq 1.5Qr \quad (3)$$

Thus, a decrease in power transfer efficiency can be suppressed by providing the correlation described above among the three resonance characteristic values being the resonance characteristic value Qo of the resonance power source 60a, the resonance characteristic value Qt of the power transfer coil 65, and the resonance characteristic value Qr of the power receiving device 200. Accordingly, the distance between the power transfer coil 65 and the power receiving coil 80 can be increased in the magnetic-resonance power transfer compared with electromagnetic-induction power transfer. Note that the electromagnetic-induction power transfer is referred to also as electromagnetic induction-coupling power transfer.

(Operation)

Next, an operation of the induction cooker of Embodiment 1 is described.

A user places the heating target 5 such as a pot at a heating port on the top plate 4 of the body 100, Further, the user places the power receiving device 200 on the top plate 4. For example, when the temperature sensor 90 of the power receiving device 200 is a non-contact sensor such as an infrared sensor, the user places the power receiving device 200 at an arbitrary position on the top plate 4. Further, for example, when the temperature sensor 90 of the power receiving device 200 is a contact sensor such as a thermistor, the user places the power receiving device 200 on the top plate 4 at a position where the power receiving device 200 is in contact with the side surface of the heating target 5. As described above, the distance at which power transfer can be performed is long in the magnetic-resonance power transfer and therefore the power receiving device 200 need not be placed at a position where the power receiving device 200 faces the power transfer coil 65.

Next, the user operates the operation display unit 43 to start heating. The controller 45 controls the inverter circuit 23 based on set electric power. The controller 45 inputs a drive signal having a high frequency of, for example, about 20 kHz to about 100 kHz to the IGBT 23a and the IGBT 23b of the inverter circuit 23. When the IGBT 23a and the IGBT 23b are alternately switched ON and OFF, a high-frequency current is supplied to the resonance circuit including the heating coil 11a and the resonant capacitor 24. When the high-frequency current flows through the heating coil 11a, a high-frequency magnetic field is generated and an eddy current flows at the bottom of the heating target 5 in a direction in which a magnetic flux change is canceled out. The heating target 5 is heated by a loss of the flowing eddy current.

Further, the controller 45 operates the power transfer circuit 60 to start power supply to the power transfer coil 65. Thus, electric power is supplied from the power transfer coil 65 to the power receiving coil 80 of the power receiving device 200 by magnetic resonance. The electric power received by the power receiving coil 80 is supplied from the power receiving circuit 81 to the power receiving-side controller 83, the power receiving-side communication device 85, and the temperature sensor 90.

The temperature sensor 90 of the power receiving device 200 detects the temperature of the heating target 5. The power receiving-side controller 83 causes the power receiving-side communication device 85 to transmit information on the temperature detected by the temperature sensor 90.

The main body-side communication unit 47 of the body 100 receives the temperature information transmitted from the power receiving-side communication device 85 and outputs the information to the controller 45. The controller 45 of the body 100 controls driving of the driver circuit 50 based on the temperature information acquired from the temperature sensor 90 of the power receiving device 200.

(Advantages)

As described above, in Embodiment 1, the body 100 includes the top plate 4 on which the heating target 5 is placed, the power transfer coil 65 configured to transfer electric power by magnetic resonance, and the power transfer circuit 60 configured to supply electric power to the power transfer coil 65. Further, the power receiving device 200 includes the power receiving coil 80 configured to receive electric power from the power transfer coil 65 by magnetic resonance, and the load circuit configured to operate by the electric power received by the power receiving coil 80. Further, the frame 6 formed to surround the outer periphery of the top plate 4 has the gaps 7, which are the discontinuous portions being electrically discontinuous from the other parts of the frame 6.

Therefore, even if the induction field generated by the power transfer coil 65 is linked to the conductive frame 6, an induced current that may circulate along the frame 6 is not generated. Thus, it is possible to suppress attenuation of electric power to be supplied from the body 100 to the power receiving device 200.

Further, the induction field generated by the power transfer coil 65 is hardly blocked by the conductive frame 6. Thus, electric power can be transferred even if the power receiving device 200 is placed out of the range of the body 100 in plan view.

Further, electric power is transferred from the body 100 of the induction cooker to the power receiving device 200 by magnetic resonance.

Therefore, restriction of the placement position of the power receiving device 200 to which electric power is transferred from the body 100 of the induction cooker can be reduced compared with that in the electromagnetic induction-coupling power transfer. Further, electric power can be transferred even if the power transfer coil 65 and the power receiving coil 80 are not disposed to face each other. Thus, the degree of freedom can be improved in terms of the placement position of the power receiving device 200 to be placed on the top plate 4, and the usability can be improved. For example, power transfer is made possible when the distance between the power transfer coil 65 and the power receiving coil 80 is a half or more of the width or depth of the top plate 4. Thus, electric power can stably be transferred even if the power receiving device 200 is placed anywhere on the top plate. Accordingly, it is possible to attain an induction cooker having excellent usability and a high degree of freedom in terms of the placement position of the power receiving device 200.

Further, electric power can be transferred even if the power transfer coil 65 and the power receiving coil 80 are not disposed to face each other. Therefore, there is no need to provide a plurality of power transfer coils 65 for the respective placement positions of the power receiving device 200. Thus, a cost-efficient induction cooker can be attained.

Further, the resonance frequency of the magnetic-resonance power transfer greatly differs from the frequency of a coil current flowing through the heating coil 11a that performs induction heating. Therefore, the power transfer from the body 100 to the power receiving device 200 is not affected by the magnetic field generated by the coil current flowing through the heating coil 11aThus, the induction heating of the heating target 5 and the power transfer to the power receiving device 200 can be performed simultaneously.

For example, in the case of electromagnetic induction-coupling power transfer, the power transfer frequency is close to the frequency of the coil current flowing through the heating coil 11aTherefore, the magnetic field of the electromagnetic induction-coupling power transfer and the magnetic field generated from the heating coil 11a may interfere with each other to cause an erroneous operation. Thus, it is difficult to perform the induction heating and the power transfer simultaneously in the case of electromagnetic induction-coupling power transfer. Accordingly, it is necessary, as countermeasures, to reduce input power for the induction heating or temporarily stop the induction heating in the electromagnetic induction-coupling power transfer.

In the induction cooker of Embodiment 1, on the other hand, electric power is transferred by magnetic resonance. Therefore, there is no need to reduce the power for the induction heating or stop the induction heating. Thus, it is possible to attain an induction cooker that has excellent usability and can cook in a short time.

Further, for example, in the case of electromagnetic induction-coupling power transfer, the power transfer efficiency significantly decreases when the position of the power transfer coil and the position of the power receiving coil are misaligned. Therefore, in the electromagnetic induction-coupling power transfer, the current flowing through the power transfer coil increases excessively and the power transfer coil generates a large amount of heat. When the positional misalignment further increases, electric power cannot be transferred to the power receiving device.

In the induction cooker of Embodiment 1, on the other hand, electric power is transferred by magnetic resonance. Therefore, electric power can stably be transferred even if the position of the power transfer coil 65 and the position of the power receiving coil 80 are misaligned, that is, even if the power transfer coil 65 and the power receiving coil 80 are not disposed to face each other.

Further, in Embodiment 1, the power transfer coil 65 is provided to surround the plurality of heating units in plan view. For example, the power transfer coil 65 is disposed below the top plate 4 to run along the edge of the top plate 4.

Therefore, one power transfer coil 65 can be disposed in a wider range in an area without the heating units on the top plate 4. Further, the resonance frequency of the magnetic-resonance power transfer greatly differs from the driving frequency of the heating coil 11aThus, the power transfer from the body 100 to the power receiving device 200 is not affected by the magnetic field generated by the coil current flowing through the heating coil 11a even though the power transfer coil 65 is provided to surround the heating coil 11a.

For example, in the case of electromagnetic induction-coupling power transfer, the frequency of the coil current flowing through the heating coil is close to the power transfer frequency. Therefore, the power transfer from the body to the power receiving device is susceptible to the magnetic field generated by the coil current flowing through the heating coil. Thus, it is necessary to dispose the power transfer coil at a position without the heating coil in the case of electromagnetic induction-coupling power transfer.

As a result, the part where the power transfer coil is disposed is restricted.

In the induction cooker of Embodiment 1, on the other hand, electric power is transferred by magnetic resonance. Therefore, the restriction of the part where the power transfer coil 65 is disposed can be reduced.

Further, in Embodiment 1, the resonance frequency of the magnetic resonance is in the megahertz band. For example, the driving frequency of the driver circuit 50 is 20 kHz or higher and lower than 100 kHz, and the resonance frequency of the magnetic resonance is 6.78 MHz or an integral multiple of 6.78 MHz.

Since the resonance frequency of the magnetic-resonance power transfer greatly differs from the frequency of the coil current flowing through the heating coil 11*a*, the power transfer from the body 100 to the power receiving device 200 is not affected by the magnetic field generated by the coil current flowing through the heating coil 11*a*, Therefore, electric power can stably be transferred irrespective of the level of the coil current, that is, the level of the input power.

Further, a conductor (metal) placed on the top plate 4 is not inductively heated by the magnetic field generated from the power transfer coil 65. For example, a metal cooker placed on the top plate 4 is not inductively heated by the magnetic field generated from the power transfer coil 65.

Further, the resonance frequency of the magnetic resonance is much higher than the frequency of the high-frequency current flowing through the heating coil 11*a*. Therefore, the inductance of the power transfer coil 65 can remarkably be reduced compared with that of the heating coil 11*a*Thus, there is no need to provide a magnetic substance such as a ferrite on the power transfer coil 65. Accordingly, the body 100 can be downsized and a cost-efficient induction cooker can be attained.

Further, in Embodiment 1, the power receiving device 200 includes the power receiving-side communication device 85 configured to transmit information on a temperature detected by the temperature sensor 90, which detects the temperature of the heating target 5. Further, the body 100 includes the main body-side communication unit 47 configured to receive the temperature information transmitted from the power receiving-side communication device 85, and the controller 45 configured to control driving of the driver circuit 50 based on the temperature information.

Therefore, restriction of the placement position of the temperature sensor 90 configured to detect the temperature of the heating target 5 can be reduced and the degree of freedom can be improved in terms of the placement position of the temperature sensor 90 to be placed on the top plate 4. Thus, the placement position of the temperature sensor 90 can arbitrarily be changed depending on, for example, the shape or size of the heating target 5. Accordingly, the usability can be improved.

Further, even if the temperature sensor 90 is a contact sensor such as a thermistor and the power receiving device 200 is placed at a position where the power receiving device 200 is in contact with the side surface of the heating target 5, the power transfer from the body 100 to the power receiving device 200 is not affected by the magnetic field generated by the coil current flowing through the heating coil 11*a*.

Thus, the side temperature can directly be detected by attaching the temperature sensor 90 directly onto the side surface of the heating target 5. Accordingly, an induction cooker having high temperature detection accuracy can be attained.

For example, if the power receiving device is attached onto the side surface of a heating target made of a metal in the case of electromagnetic induction-coupling power transfer, the magnetic field is blocked when a magnetic flux generated by electromagnetic induction is linked to a metal portion of the side surface of the heating target. Therefore, electric power cannot be transferred.

In the induction cooker of Embodiment 1, on the other hand, electric power is transferred by magnetic resonance. Therefore, the effect of the metal portion of the heating target 5 is reduced and electric power can be transferred.

MODIFIED EXAMPLE 1

Figure 8:
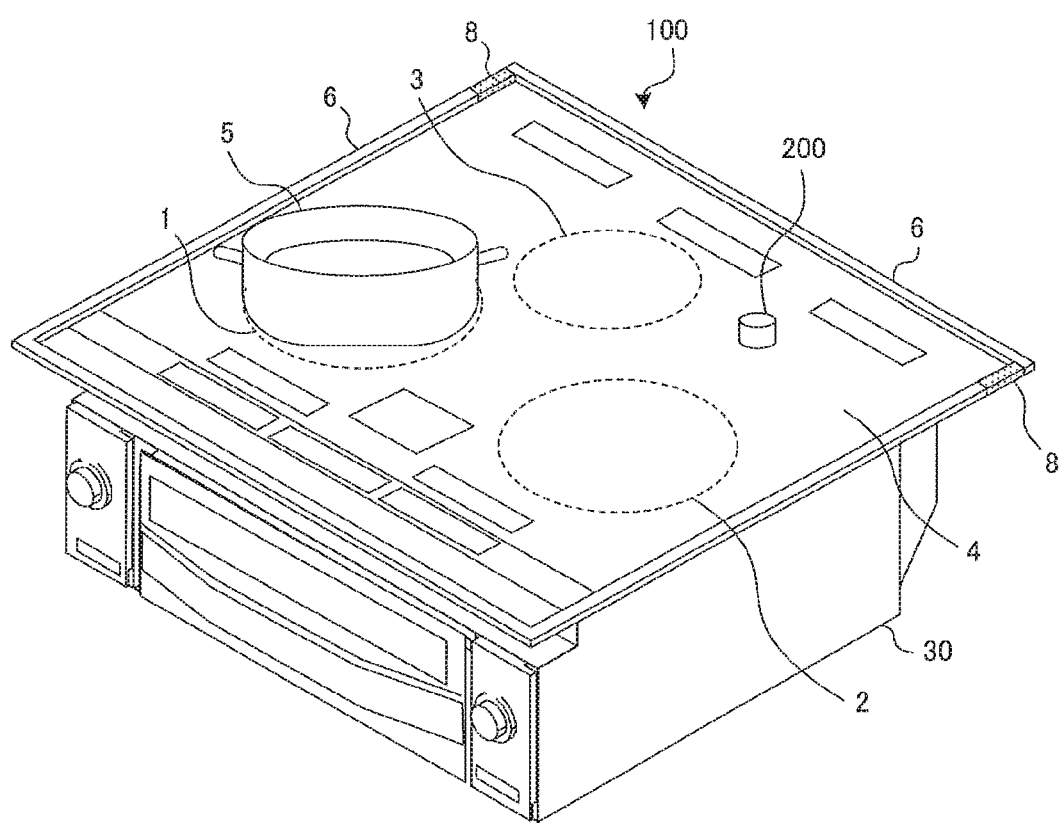
FIG. 8 is a perspective view illustrating Modified Example 1 of the induction cooker according to Embodiment 1.

FIG. 8 is a perspective view illustrating Modified Example 1 of the induction cooker according to Embodiment 1.

As illustrated in FIG. 8, the frame 6 may partially have non-conductive portions 8 each made of a non-conductive material such as a resin. The non-conductive portion 8 is the discontinuous portion where a part of the outer periphery of the top plate 4 surrounded by the frame 6 has electrical discontinuity from the other parts of the frame 6.

With this structure as well, the induced current that may circulate along the frame 6 is not generated. Thus, it is possible to suppress attenuation of electric power to be supplied from the body 100 to the power receiving device 200. Further, the strength of the top plate 4 can be increased by the non-conductive portions 8 each made of the non-conductive material such as a resin.

Note that FIG. 8 illustrates a case where two non-conductive portions 8 are provided at the rear ends of the body 100 but the present disclosure is not limited thereto. At least one non-conductive portion 8 may be provided at an arbitrary position on the outer periphery of the top plate 4.

MODIFIED EXAMPLE 2

Figure 9:
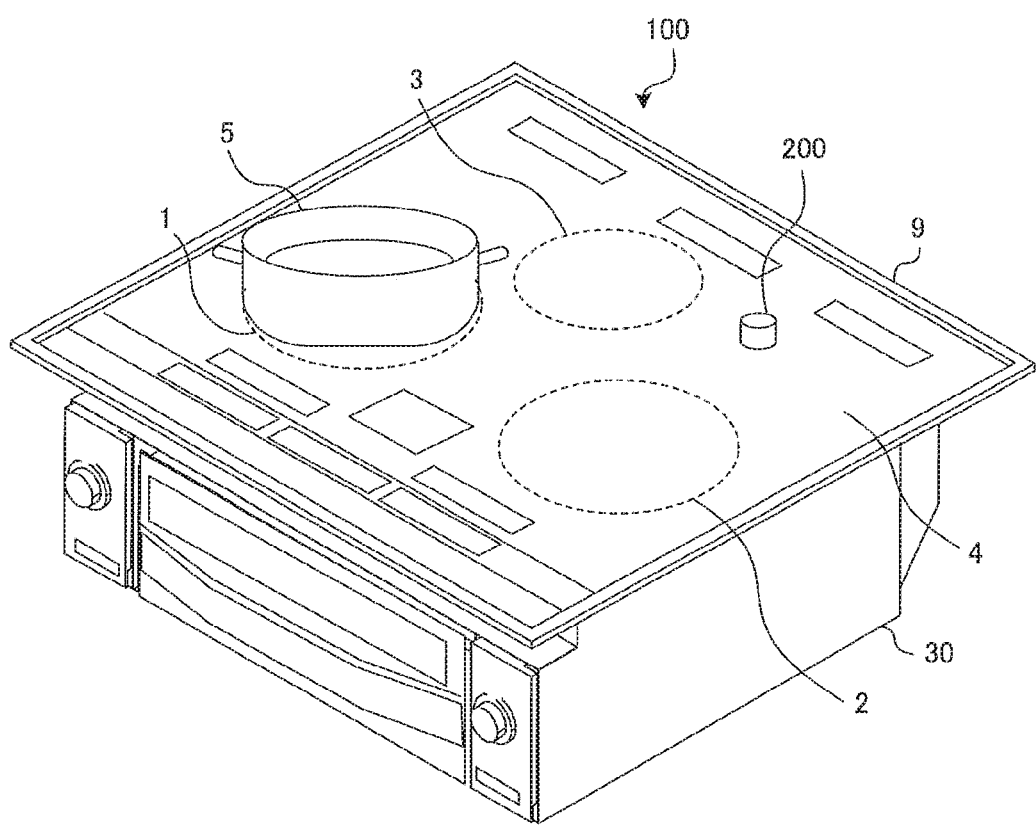
FIG. 9 is a perspective view illustrating Modified Example 2 of the induction cooker according to Embodiment 1.

FIG. 9 is a perspective view illustrating Modified Example 2 of the induction cooker according to Embodiment 1.

As illustrated in FIG. 9, the top plate 4 has a frame 9 formed to surround the outer periphery of the top plate 4. The entire frame 9 is made of a non-conductive material such as a resin. That is, the entire frame 9 is the discontinuous portion that is electrically discontinuous.

With this structure as well, the induced current that may circulate along the frame 6 is not generated. Thus, it is possible to suppress attenuation of electric power to be supplied from the body 100 to the power receiving device 200.

Embodiment 2

In Embodiment 2, description is made of a structure including the operation display unit 43 as the load circuit of the power receiving device.

Note that, in the following description, the same parts as those in Embodiment 1 are represented by the same reference signs and differences from Embodiment 1 are mainly described.

Figure 10:
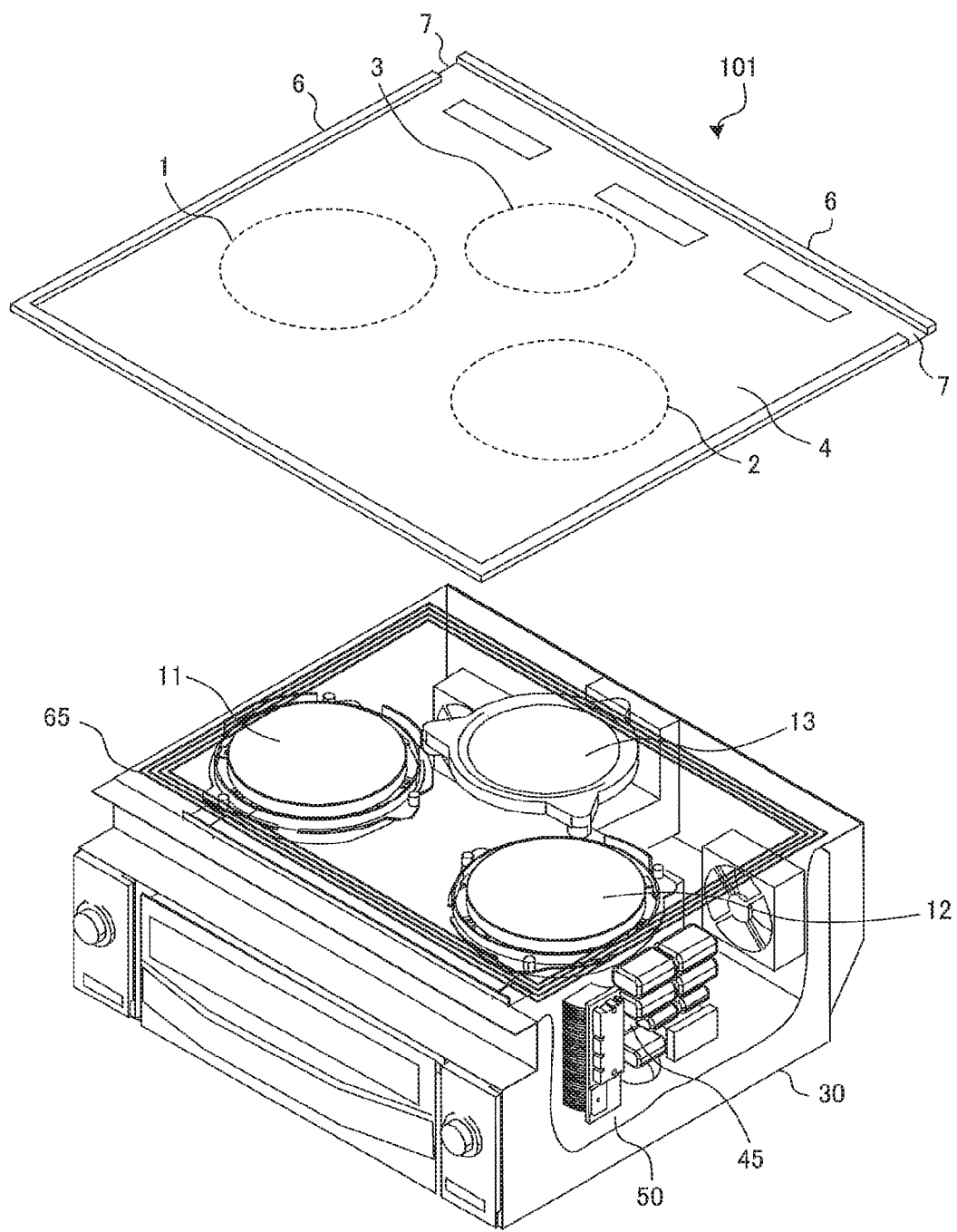
FIG. 10 is an exploded perspective view illustrating a body of an induction cooker according to Embodiment 2.

FIG. 10 is an exploded perspective view illustrating a body of an induction cooker according to Embodiment 2.

Figure 11:
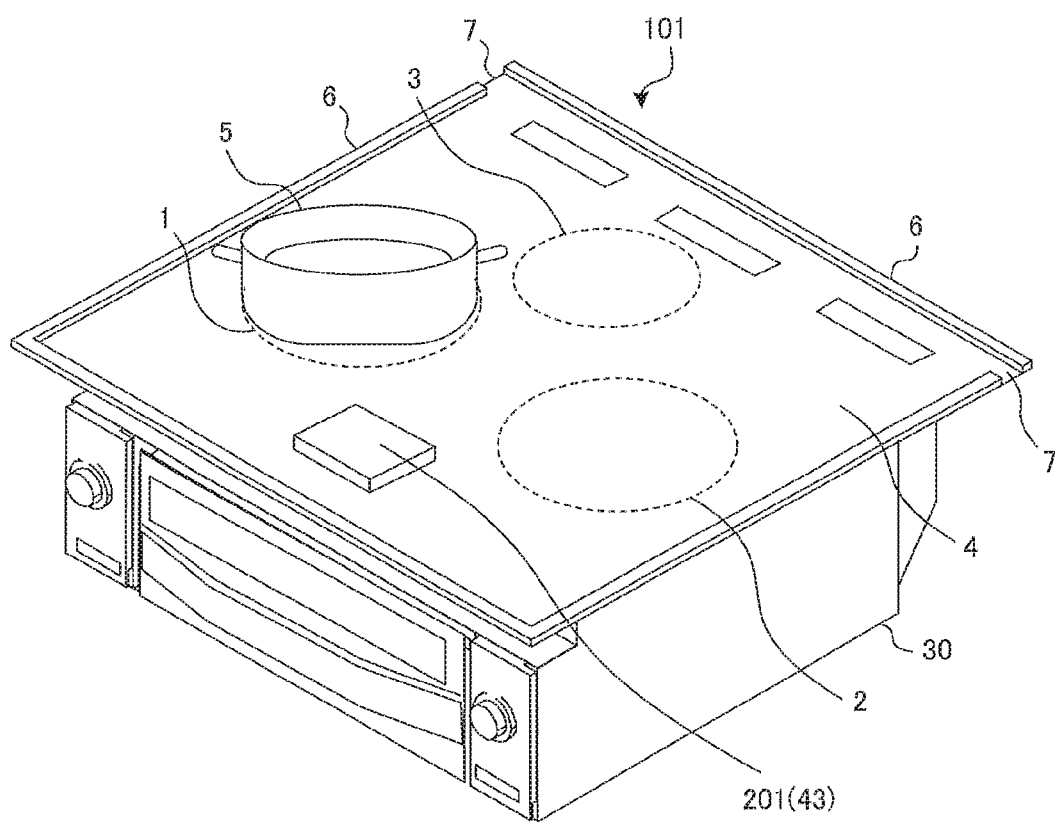
FIG. 11 is a perspective view illustrating the body of the induction cooker and a power receiving device according to Embodiment 2.

FIG. 11 is a perspective view illustrating the body of the induction cooker and a power receiving device according to Embodiment 2.

Figure 12:
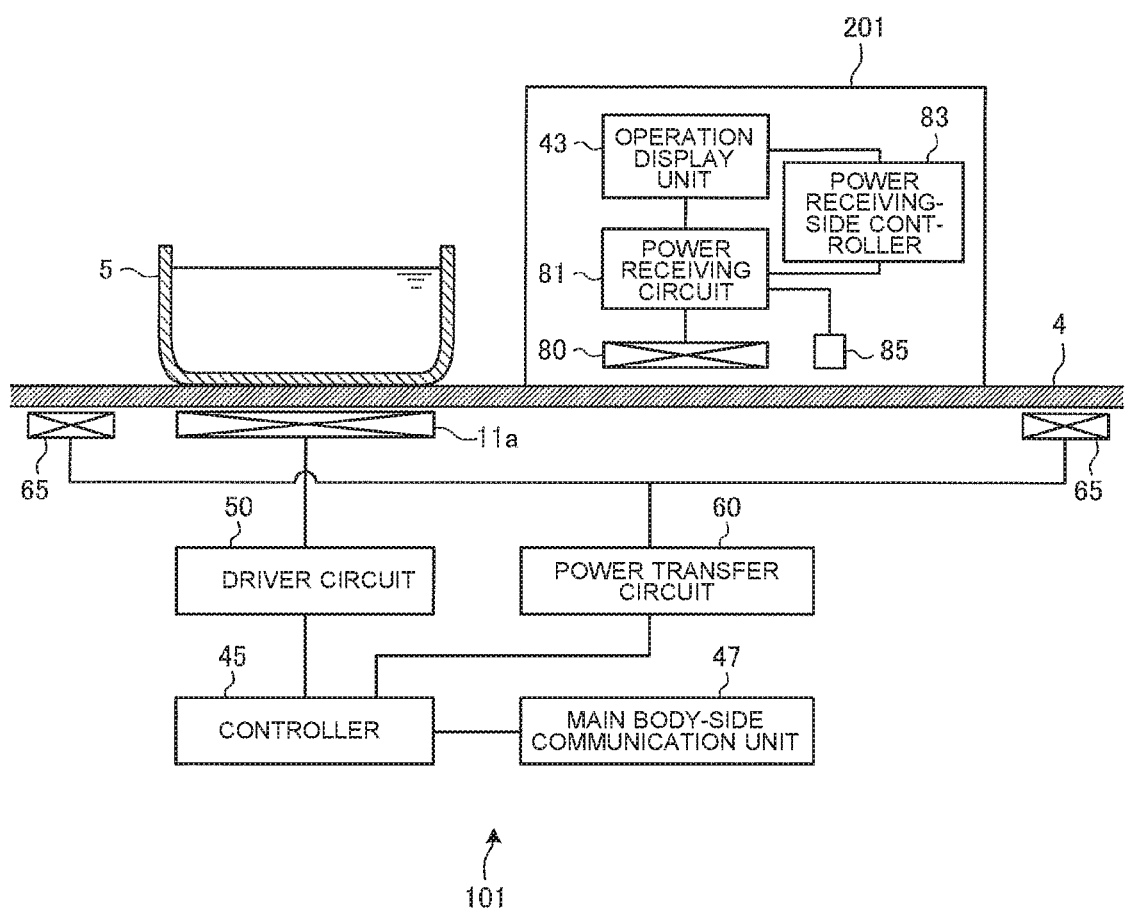
FIG. 12 is a block diagram illustrating the structures of the body of the induction cooker and the power receiving device according to Embodiment 2.

FIG. 12 is a block diagram illustrating the structures of the body of the induction cooker and the power receiving device according to Embodiment 2.

As illustrated in FIG. 10 to FIG. 12, a body 101 of the induction cooker according to Embodiment 2 does not have the operation unit 40, the display unit 41, and the operation display unit 43, which is a combination of the operation unit 40 and the display unit 41. The other structure of the body 101 is similar to that of the body 100 of Embodiment 1.

A power receiving device 201 on the induction cooker according to Embodiment 2 includes the operation display unit 43 as the load circuit.

The operation display unit 43 of the power receiving device 201 operates by electric power supplied from the power receiving circuit 81. The operation display unit 43 is a combination of the operation unit 40 configured to perform an input operation for the body 101 of the induction cooker and the display unit 41 configured to display information related to the operation of the body 101. The other structure of the power receiving device 201 is similar to that of the power receiving device 200 of Embodiment 1.

Note that the operation unit 40, the display unit 41, and the operation display unit 43 of Embodiment 2 serve as the load circuit.

In this structure, the power receiving-side controller 83 causes the power receiving-side communication device 85 to transmit input operation information from the operation display unit 43. For example, the input operation information is setting information on cooking menus or input power for heating the heating target 5.

The controller 45 of the body 101 controls driving of the driver circuit 50 based on the input operation information received by the main body-side communication unit 47.

Further, the controller 45 causes the main body-side communication unit 47 to transmit display information related to the operation of the body 101. The power receiving-side controller 83 of the power receiving device 201 causes the operation display unit 43 to display the display information received by the power receiving-side communication device 85. For example, the display information is information on the operating condition and settings of cooking menus or input power for heating the heating target 5.

As described above, in Embodiment 2, the power receiving device 201 includes the operation display unit 43, which is a combination of the operation unit 40 configured to perform an input operation for the body 101 of the induction cooker and the display unit 41 configured to display information related to the operation of the body 101.

Therefore, the degree of freedom can be improved in terms of the placement position of the operation display unit 43 and the usability can be improved in addition to the advantages of Embodiment 1. Further, even if the power receiving device 201 includes an electronic component such as an LCD whose power consumption is relatively large, the power receiving device 201 can be used without concern for battery exhaustion. Further, the battery can be omitted. Further, the body 101 does not have the operation unit 40, the display unit 41, and the operation display unit 43, which is a combination of the operation unit 40 and the display unit 41. Therefore, the structure of the body 101 can be simplified and the body 101 can be downsized.

Note that Embodiment 2 is directed to the structure in which the body 101 does not have the operation unit 40, the display unit 41, and the operation display unit 43 but the present disclosure is not limited thereto. The body 101 may have the operation unit 40 or the display unit 41. Further, both the body 101 and the power receiving device 201 may have the operation unit 40 and the display unit 41. Further, the operation unit 40 and the display unit 41 may be provided in part.

MODIFIED EXAMPLE 1

Figure 13:
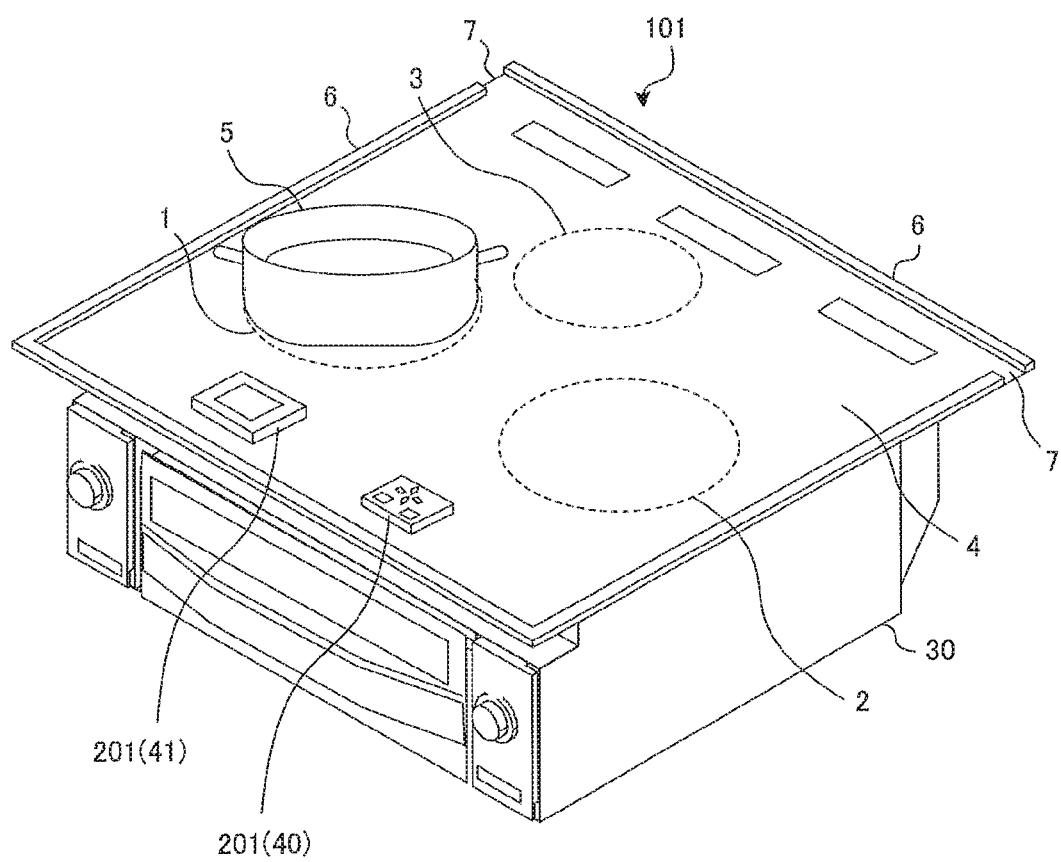
FIG. 13 is a perspective view illustrating Modified Example 1 of the power receiving device on the induction cooker according to Embodiment 2.

FIG. 13 is a perspective view illustrating Modified Example 1 of the power receiving device on the induction cooker according to Embodiment 2.

As illustrated in FIG. 13, a plurality of power receiving devices 201 may be provided. One of the plurality of power receiving devices 201 includes, as the load circuit, the operation unit 40 including mechanical switches such as push-switches or tact switches, or a touch switch configured to detect an input operation through a change in capacitance of an electrode. Further, another one of the plurality of power receiving devices 201 includes, as the load circuit, the display unit 41 such as an LCD or an LED.

With this structure as well, each of the plurality of power receiving devices 201 can receive electric power from one power transfer coil 65.

MODIFIED EXAMPLE 2

Figure 14:
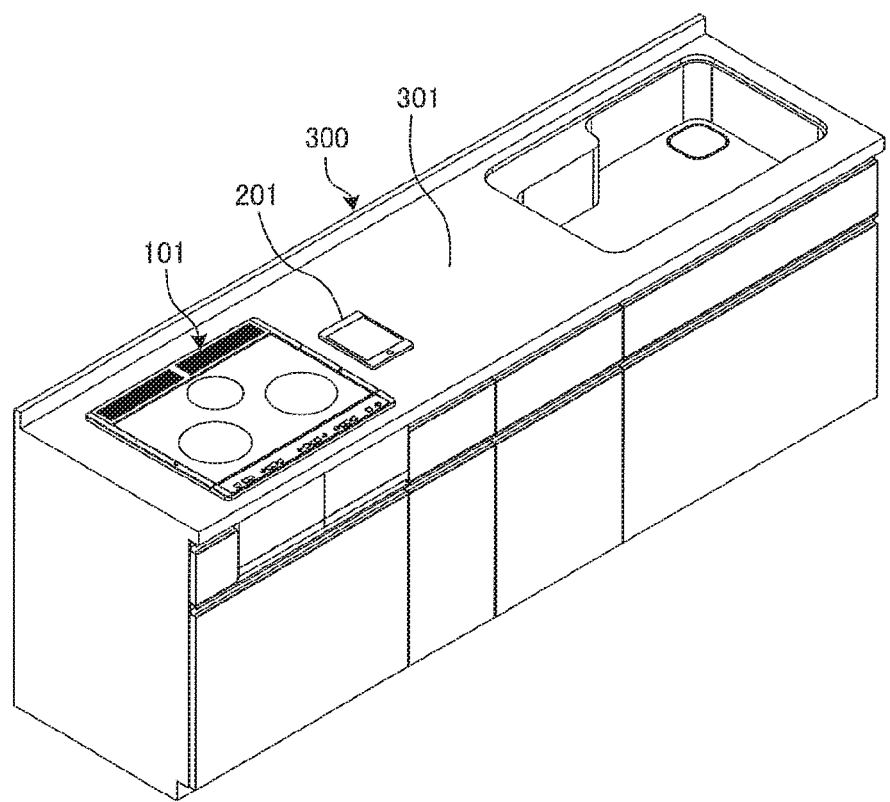
FIG. 14 is a perspective view illustrating Modified Example 2 of the power receiving device on the induction cooker according to Embodiment 2.

FIG. 14 is a perspective view illustrating Modified Example 2 of the power receiving device on the induction cooker according to Embodiment 2.

As illustrated in FIG. 14, the body 101 of the induction cooker is disposed in kitchen furniture 300 having a sink and other components. The kitchen furniture 300 has a casing space (not illustrated) where the body 101 of the induction cooker is fitted. A flat-plate worktop 301 is provided at the top of the kitchen furniture 300. In a state in which the body 101 of the induction cooker is built in the kitchen furniture 300, the top plate 4 of the induction cooker is exposed at the worktop 301. The worktop 301 of the kitchen furniture 300 is made of an insulating (non-metal)material typified by wood, a resin such as engineered marble, or stone.

In this structure, the power receiving device 201 having the operation display unit 43 may be placed on the worktop 301 of the kitchen furniture 300.

Electric power is transferred from the body 101 of the induction cooker to the power receiving device 201 by magnetic resonance. Therefore, the electric power can be transferred even if the power transfer coil 65 and the power receiving coil 80 are not disposed to face each other. Further, the worktop 301 is made of the insulating material. Therefore, the power transfer coil 65 and the power receiving coil 80 are not blocked out therebetween, Therefore, electric power can be transferred from the body 101 even if the power receiving device 201 is placed on the worktop 301. Thus, the operation display unit 43 can be operated and can display information while the power receiving device 201 is placed on the worktop 301. Accordingly, the usability of the induction cooker can be improved.

Note that a mobile information terminal such as a smartphone or a tablet terminal may be used as the power receiving device 201. Specifically, the mobile information terminal includes the power receiving coil 80 configured to receive electric power from the power transfer coil 65 by magnetic resonance, and electric power is transferred from the body 100 of the induction cooker.

With this structure, even if the power receiving device 201 includes an electronic component such as an LCD whose power consumption is relatively large, the power receiving device 201 can be used without concern for battery exhaustion.

MODIFIED EXAMPLE 3

Figure 15:
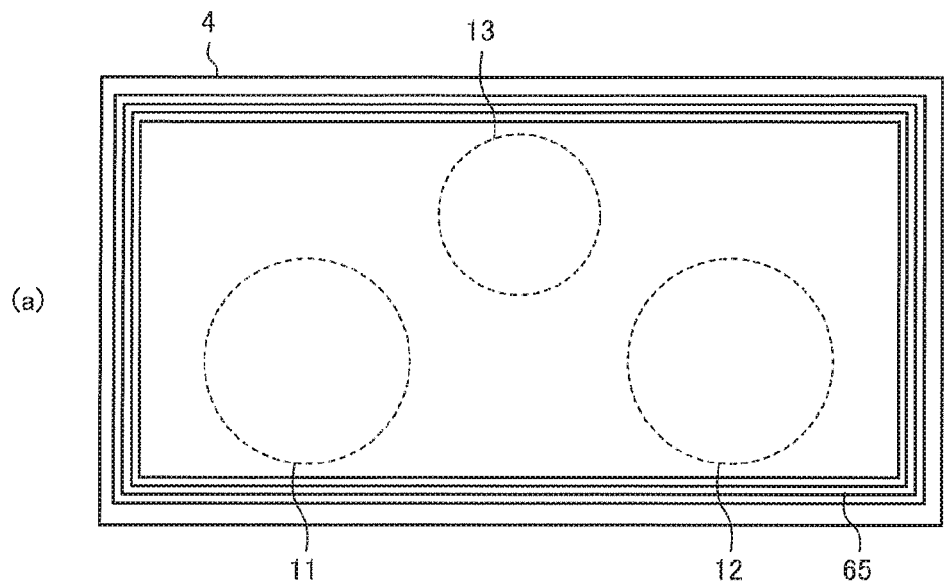
FIGS. 15 are diagrams illustrating Modified Example 3 of the induction cooker according to Embodiment 2.

FIGS. 15 are diagrams illustrating Modified Example 3 of the induction cooker according to Embodiment 2.

FIG. 15(a) is a plan view of the top plate 4 seen from the back. FIG. 15(b) is a side view of the top plate 4.

As illustrated in FIGS. 15, the power transfer coil 65 may be disposed in contact with the bottom surface of the top plate 4. For example, the power transfer coil 65 may be provided on the bottom surface of the top plate 4 by printed wiring.

With this structure, the body 100 can be downsized. Further, the assembling process for the body 100 can be simplified and a cost-efficient induction cooker can be attained.

Embodiment 3

In Embodiment 3, disposition of the power transfer coil 65 is described. Note that, in the following description, the same parts as those in Embodiments 1 and 2 are represented by the same reference signs and differences from Embodiments 1 and 2 are mainly described.

Figure 16:
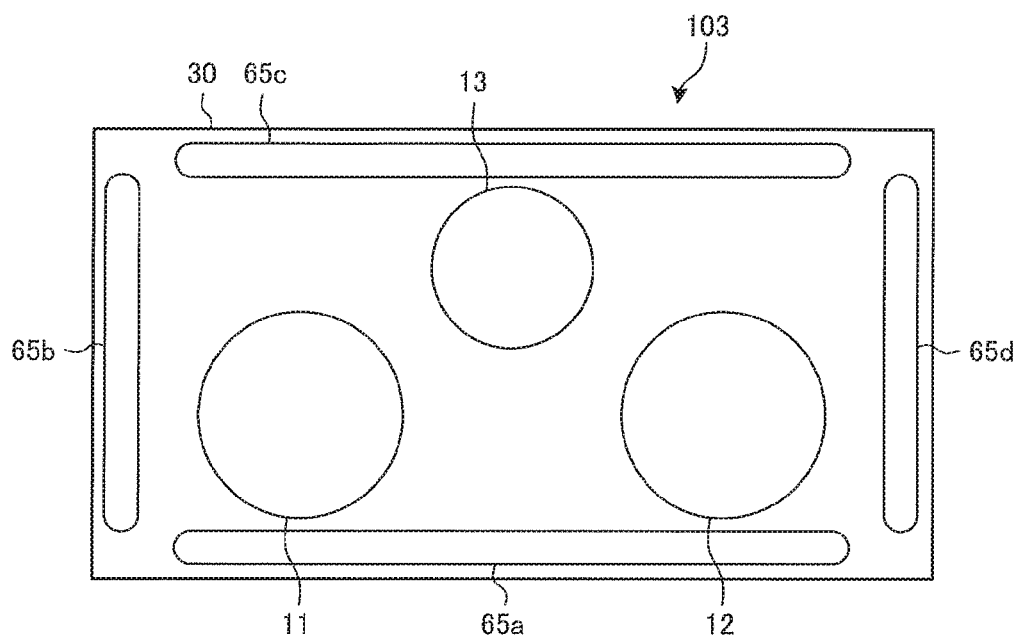
FIG. 16 is a diagram schematically illustrating heating units and power transfer coils of an induction cooker according to Embodiment 3.

FIG. 16 is a diagram schematically illustrating heating units and power transfer coils of an induction cooker according to Embodiment 3. Note that FIG. 16 schematically illustrates positional relationships between the heating units and power transfer coils 65a to 65d in the casing 30 when the top plate 4 is removed.

As illustrated in FIG. 16, a body 103 of the induction cooker according to Embodiment 3 includes the power transfer coils 65a to 65d. The power transfer coils 65a to 65d are supplied with electric power from power transfer circuits 60 provided individually. The structure of the power transfer circuit 60 is similar to that in Embodiment 1.

The power transfer coils 65a to 65d are provided between the heating units and the edge of the top plate 4 in plan view.

That is, the power transfer coil 65a is provided between the first heating unit 11 and the edge of the top plate 4 and between the second heating unit 12 and the edge of the top plate 4 in plan view. Further, the power transfer coil 65b is provided between the first heating unit 11 and the edge of the top plate 4 in plan view. Further, the power transfer coil 65c is provided between the third heating unit 13 and the edge of the top plate 4 in plan view. Further, the power transfer coil 65d is provided between the second heating unit 12 and the edge of the top plate 4 in plan view.

Further, the power transfer coils 65a to 65d are provided between the heating units and the edge of the top plate 4 to run along the edges of the rectangle of the top plate 4 in plan view.

That is, the power transfer coil 65a is provided between the first heating unit 11 and the edge of the top plate 4 and between the second heating unit 12 and the edge of the top plate 4 to run along the front side of the top plate 4 in plan view. Further, the power transfer coil 65b is provided between the first heating unit 11 and the edge of the top plate 4 to run along the left side of the top plate 4 in plan view. Further, the power transfer coil 65c is provided between the third heating unit 13 and the edge of the top plate 4 to run along the rear side of the top plate 4 in plan view. Further, the power transfer coil 65d is provided between the second heating unit 12 and the edge of the top plate 4 to run along the right side of the top plate 4 in plan view.

With this structure, the minor diameter of each of the power transfer coils 65a to 65d can be reduced compared with that of the power transfer coil 65 of Embodiments 1 and 2.

Therefore, a difference between the diameter of each of the power transfer coils 65a to 65d and the diameter of the power receiving coil 80 can be reduced. Thus, the rate of flux linkage from the power transfer coils 65a to 65d to the power receiving coil 80 increases and the power supply efficiency of the magnetic-resonance power transfer can be improved. Further, the power receiving device 200 placed on the top surface of the top plate 4 or near the body 103 is supplied with electric power from the closest power transfer coil 65 among the power transfer coils 65a to 65d. Thus, the power supply efficiency can be improved.

Note that if importance is put on the improvement in the power supply efficiency, misalignment between the position where the power receiving coil 80 is placed and the position where each of the power transfer coils 65a to 65d is disposed is desirably a half or less of the minor diameter of each of the power transfer coils 65a to 65d.

Embodiment 4

In Embodiment 4, disposition of the power transfer coil 65 is described. Note that, in the following description, the same parts as those in Embodiments 1 to 3 are represented by the same reference signs and differences from Embodiments 1 to 3 are mainly described.

Figure 17:
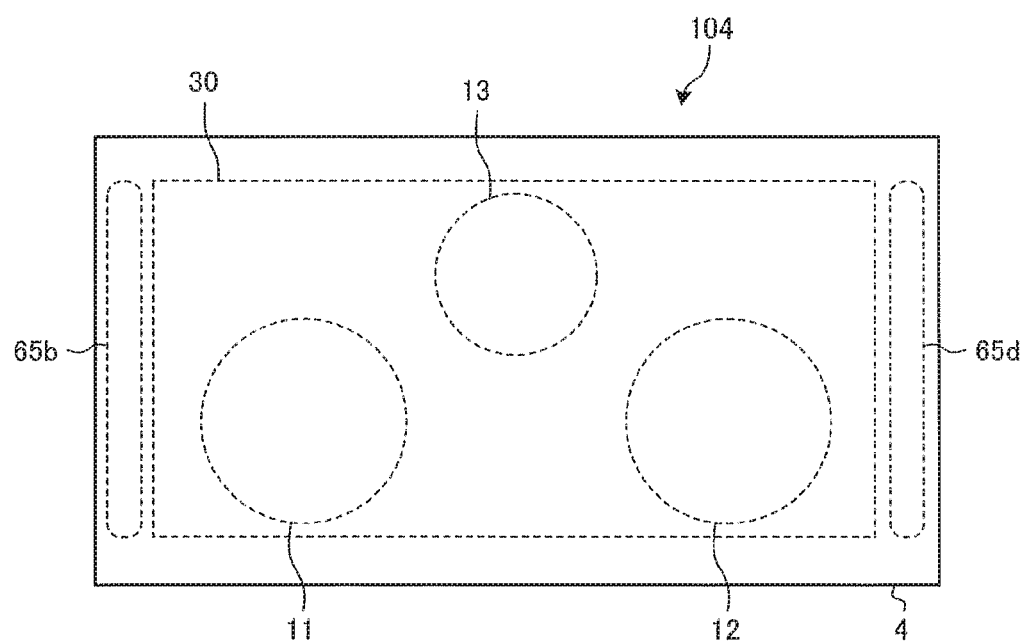
FIG. 17 is a diagram schematically illustrating heating units and power transfer coils of an induction cooker according to Embodiment 4.

FIG. 17 is a diagram schematically illustrating heating units and power transfer coils of an induction cooker according to Embodiment 4.

Figure 18:
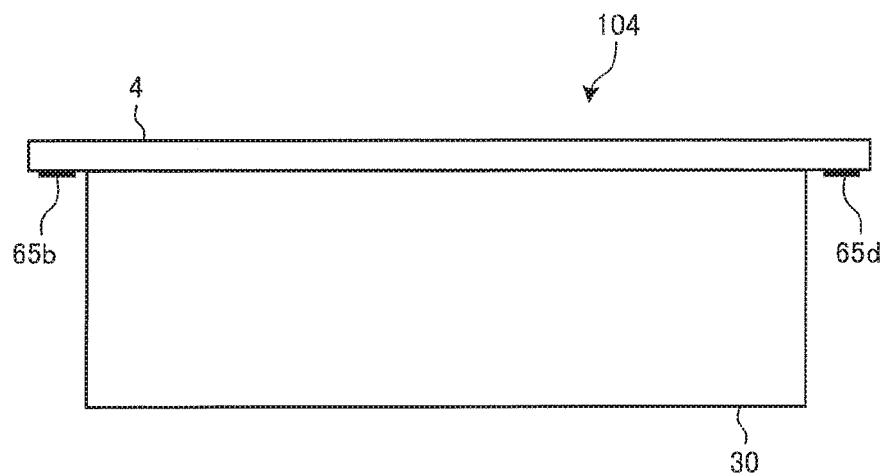
FIG. 18 is a front view schematically illustrating a body of the induction cooker according to Embodiment 4.

FIG. 18 is a front view schematically illustrating a body of the induction cooker according to Embodiment 4.

Note that FIG. 17 schematically illustrates positional relationships between the casing 30 and the power transfer coils 65b and 65d when the top plate 4 is seen from the top. Further, FIG. 18 schematically illustrates positional relationships between the top plate 4 and the power transfer coils 65b and 65d and between the casing 30 and the power transfer coils 65b and 65d when a body 104 is seen from the front. Note that, in FIG. 18, illustration is omitted for the components provided at the front of the body 104.

As illustrated in FIG. 17 and FIG. 18, the body 104 of the induction cooker according to Embodiment 4 includes the power transfer coils 65b and 65d. The power transfer coils 65b and 65d are supplied with electric power from the power transfer circuits 60 provided individually. The structure of the power transfer circuit 60 is similar to that in Embodiment 1.

In plan view, the size of the casing 30 is smaller than that of the top plate 4.

The power transfer coils 65b and 65d are provided between the casing 30 and the edge of the top plate 4 in plan view.

That is, the power transfer coil 65b is provided between the left surface of the casing 30 and the edge of the top plate 4 in plan view. Further, the power transfer coil 65d is provided between the right surface of the casing 30 and the edge of the top plate 4 in plan view.

Further, as illustrated in FIG. 18, the power transfer coils 65b and 65d are disposed in contact with the bottom surface of the top plate 4. For example, the power transfer coils 65b and 65d are provided on the bottom surface of the top plate 4 by printed wiring.

With this structure, even if the casing 30 is made of a conductive material, the induction field generated by the power transfer coil 65 is hardly blocked by the casing 30. Thus, electric power can be transferred with high efficiency. This advantage is remarkable particularly when the power receiving device 200 is placed out of the range of the body 104 in plan view.

Further, when the body 104 of the induction cooker is housed in the casing space of the kitchen furniture, the power transfer coils 65b and 65d are disposed on the top surface of the kitchen furniture. Therefore, the induction field generated by each of the power transfer coils 65b and 65d is hardly blocked by the kitchen furniture.

Embodiment 5

In Embodiment 5, the structure of the casing 30 is described.

Note that, in the following description, the same parts as those in Embodiments 1 to 4 are represented by the same reference signs and differences from Embodiments 1 to 4 are mainly described.

Figure 19:
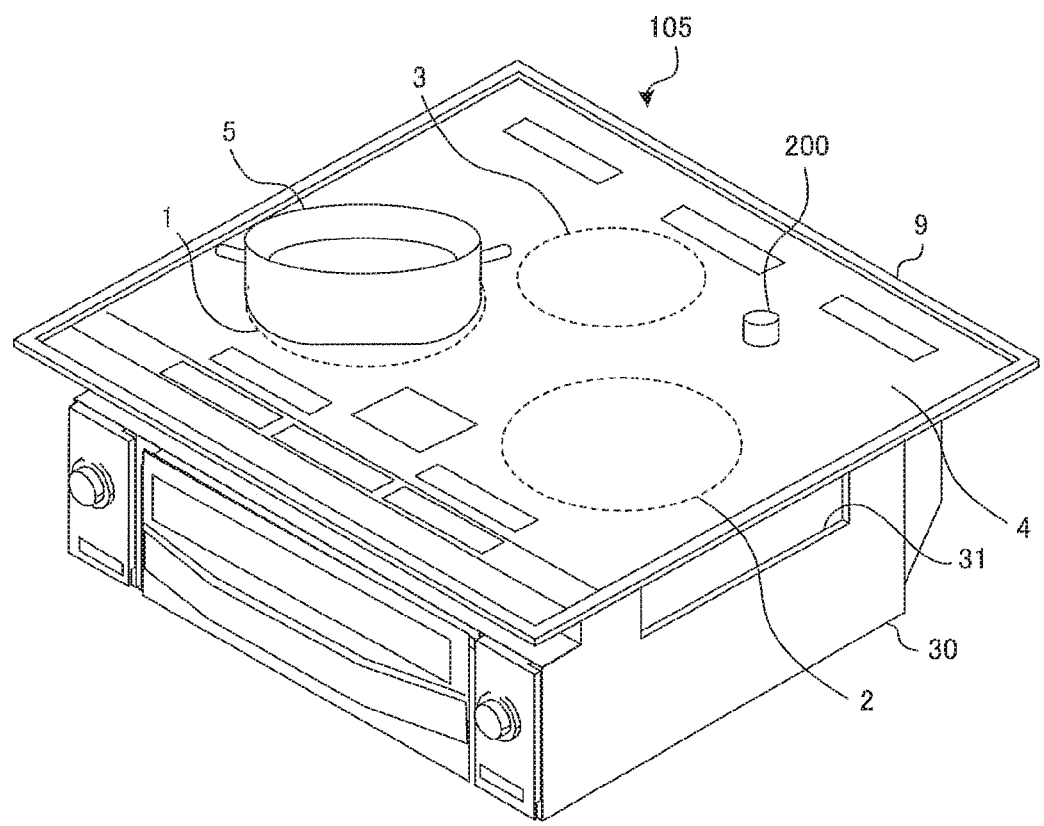
FIG. 19 is a perspective view illustrating a body of an induction cooker and a power receiving device according to Embodiment 5.

FIG. 19 is a perspective view illustrating a body of an induction cooker and a power receiving device according to Embodiment 5.

Figure 20:
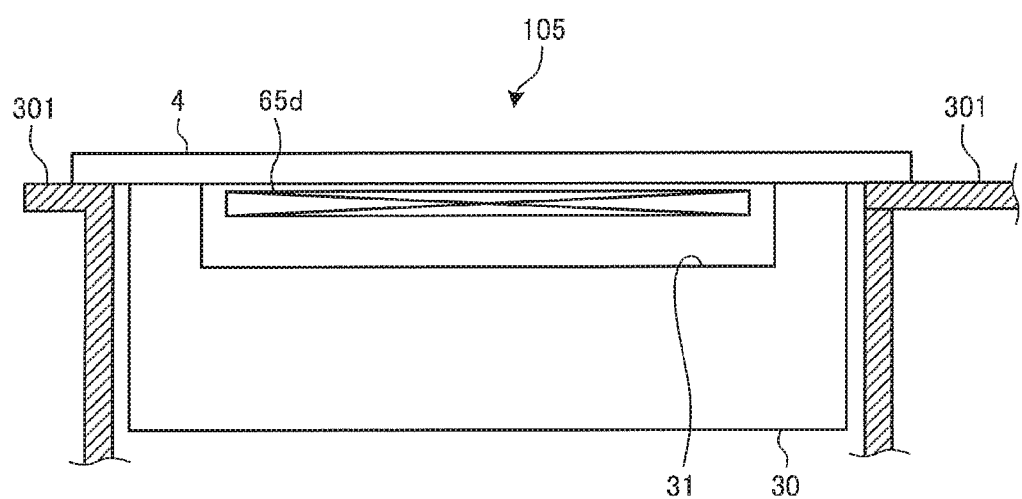
FIG. 20 is a side view schematically illustrating the body of the induction cooker according to Embodiment 5.

FIG. 20 is a side view schematically illustrating the body of the induction cooker according to Embodiment 5.

Note that FIG. 20 illustrates a state in which a body 105 is housed in the casing space of the kitchen furniture and the bottom surface of the top plate 4 is supported on the worktop 301 of the kitchen furniture.

As illustrated in FIG. 19 and FIG. 20, the casing 30 of the body 105 of the induction cooker according to Embodiment 5 is made of a conductive material and has an opening 31 on the side surface. The lower end of the opening 31 of the casing 30 is desirably located, for example, below the lower end of the power transfer coil 65d.

Note that the position of the opening 31 is not limited to the right surface of the casing 30 and the opening 31 may be provided on the left, front, or rear surface.

With this structure, even if the casing 30 is made of a conductive material, the induction field generated by the power transfer coil 65 is hardly blocked by the casing 30 because the induction field passes through the opening 31. Thus, electric power can be transferred with high efficiency. This advantage is remarkable particularly when the power receiving device 200 is placed out of the range of the body 105 in plan view.

MODIFIED EXAMPLE

Figure 21:
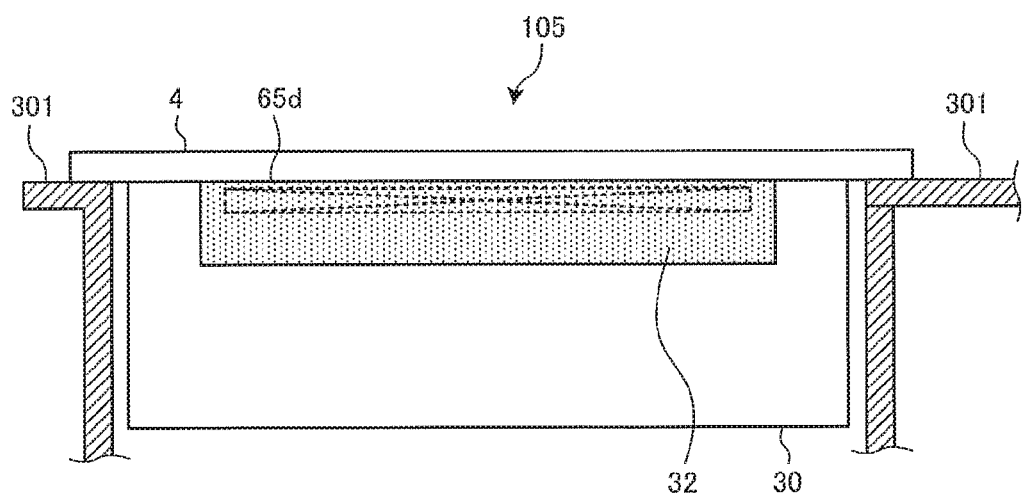
FIG. 21 is a side view schematically illustrating a modified example of the body of the induction cooker according to Embodiment 5.

FIG. 21 is a side view schematically illustrating a modified example of the body of the induction cooker according to Embodiment 5.

As illustrated in FIG. 21, the casing 30 of the body 105 of the induction cooker has, in a part of the side surface, a magnetic field passing portion 32 made of a non-conductive material such as a resin. The lower end of the magnetic field passing portion 32 of the casing 30 is desirably located, for example, below the lower end of the power transfer coil 65d.

Note that the casing 30 may have the magnetic field passing portion 32 on the entire side surface. Further, the entire casing 30 may be made of a non-conductive material such as a resin.

With this structure as well, the induction field generated by the power transfer coil 65 is hardly blocked by the casing 30 because the induction field passes through the magnetic field passing portion 32. Thus, electric power can be transferred with high efficiency. This advantage is remarkable particularly when the power receiving device 200 is placed out of the range of the body 105 in plan view.

Note that the load circuit of the power receiving device is not limited to the examples in Embodiments 1 to 5 and may be a cooking appliance such as a fryer, a steam cooker, a roaster, or a toaster configured to cook food.

Further, for example, the load circuit of the power receiving device may be a cooking appliance such as a blender, a mixer, a mill, a whisk, or a food processor for preparation and precooking.

Further, for example, the load circuit of the power receiving device may be an ingredient detection sensor placed in the heating target 5 and configured to detect ingredients of food, such as salt or sugar.

Further, a plurality of load circuits may be combined. That is, a plurality of power receiving devices may be provided and the type of at least one load circuit may be made different from other types.

REFERENCE SIGNS LIST first heating port 2 second heating port 3 third heating port 4 top plate 5 heating target 6 frame 7 gap 8 non-conductive portion 9 frame first heating unit 11a heating coil 12 second heating unit 13 third heating unit 21 AC power source 22 DC power circuit 22a diode bridge 22b reactor 22c smoothing capacitor 23 inverter circuit 23a IGBT 23b IGBT 23c diode 23d diode 24 resonant capacitor 25 input current detection unit 26 coil current detection unit 30 casing 31 opening 32 magnetic field passing portion operation unit 40a operation unit 40b operation unit 40c operation unit display unit 41a display unit 41b display unit 41c display unit 43 operation display unit 45 controller 47 main body-side communication unit 50 driver circuit 60 power transfer circuit 60a resonance power source 60b matching circuit 65 power transfer coil 65a power transfer coil 65b power transfer coil 65c power transfer coil 65d power transfer coil 80 power receiving coil 81 power receiving circuit 81a rectifying circuit 81b conversion circuit 83 power receiving-side controller 85 power receiving-side communication device 90 temperature sensor 100 body 101 body 103 body 104 body 105 body 200 power receiving device 201 power receiving device 300 kitchen furniture 301 worktop

The invention claimed is:

1. An induction cooker comprising:
   a top plate on which a heating target is placed,
   a frame formed of a material having electrical conductivity and configured to surround a part of an outer periphery of the top plate,
   a discontinuous portion formed at a part of the outer periphery of the top plate to surround the outer periphery of the top plate together with the frame, and having electrical discontinuity from the frame,
   a heating coil disposed below the top plate, and configured to inductively heat the heating target,
   a driver circuit configured to supply electric power to the heating coil,
   a power transfer coil configured to transfer electric power by magnetic resonance, and
   a power transfer circuit configured to supply electric power to the power transfer coil.

2. The induction cooker of claim 1, wherein the discontinuous portion is a gap formed as a part of the frame.

3. The induction cooker of claim 1, wherein the discontinuous portion is made of a non-conductive material.

4. The induction cooker of claim 1, wherein the power transfer coil is provided to surround the heating coil in plan view.

5. The induction cooker of claim 1,
   wherein the heating coil comprises a plurality of heating coils, and wherein the power transfer coil is provided to surround the plurality of heating coils in plan view.

6. The induction cooker of claim 1, wherein the power transfer coil is disposed below the top plate to run along an edge of the top plate.

7. The induction cooker of claim 1, wherein the power transfer coil is provided between the heating coil and an edge of the top plate in plan view.

8. The induction cooker of claim 1,
wherein the top plate is shaped into a rectangle in plan view, and
wherein the power transfer coil is provided between the heating coil and an edge of the top plate to run along edges of the rectangle in plan view.

9. The induction cooker of claim 1, further comprising a casing, which is provided below the top plate and houses the heating coil,
wherein a size of the casing is smaller than a size of the top plate in plan view, and
wherein the power transfer coil is provided between the casing and an edge of the top plate in plan view.

10. The induction cooker of claim 1, further comprising a casing, which is provided below the top plate and houses the heating coil and the power transfer coil,
wherein the casing is made of a conductive material and has an opening on a side face of the casing.

11. The induction cooker of claim 10, wherein a lower end of the opening is located below a lower end of the power transfer coil.

12. The induction cooker of claim 1, further comprising a casing, which is provided below the top plate and houses the heating coil and the power transfer coil,
wherein the casing is made of a non-conductive material in at least a part of a side face of the casing.

13. The induction cooker of claim 1, wherein the power transfer coil is disposed in contact with a bottom surface of the top plate.

14. The induction cooker of claim 1, wherein a resonance frequency of the magnetic resonance is a frequency in a megahertz band.

15. The induction cooker of claim 14,
wherein a driving frequency of the driver circuit is 20 kHz or higher and lower than 100 kHz, and
wherein the resonance frequency of the magnetic resonance is 6.78 MHz or an integral multiple of 6.78 MHz.

16. The induction cooker of claim 1 including the body including the top plate, the frame, the-discontinuous portion, the heating coil, the driver circuit, the power transfer coil, and the power transfer circuit, the induction cooker further comprising
a power receiving device including
a power receiving coil configured to receive electric power from the power transfer coil by magnetic resonance, and
a load circuit configured to operate by the electric power received by the power receiving coil.

17. The induction cooker of claim 16,
wherein the load circuit is a temperature sensor configured to detect a temperature of the heating target,
wherein the power receiving device includes a first communication device configured to transmit information on the temperature detected by the temperature sensor, and
wherein the body includes
a second communication device configured to receive the information on the temperature, which is transmitted from the first communication device, and
a controller configured to control driving of the driver circuit based on the information on the temperature.

18. The induction cooker of claim 16,
wherein the load circuit is an operation unit configured to perform an input operation for the body,
wherein the power receiving device includes a first communication device configured to transmit information on the input operation performed by the operation unit, and
wherein the body includes
a second communication device configured to receive the information on the input operation, which is transmitted from the first communication device, and
a controller configured to control driving of the driver circuit based on the information on the input operation.

19. The induction cooker of claim 16,
wherein the load circuit is a display unit configured to display information related to an operation of the body,
wherein the power receiving device includes a first communication device configured to receive the information to be displayed on the display unit, and
wherein the body includes a second communication device configured to transmit the information to be displayed on the display unit.

20. The induction cooker of claim 16,
wherein the power transfer circuit includes a resonance power source configured to supply electric power to the power transfer coil,
wherein the power receiving device includes a power receiving circuit configured to supply the load circuit with the electric power received by the power receiving coil, and
wherein characteristic impedances of the resonance power source, the power transfer coil, the power receiving coil, and the power receiving circuit are set so that the following condition is satisfied, $0.5Qr \leq \sqrt{(Qo \cdot Qt)} \leq 1.5Qr$ where Qo represents a resonance characteristic value of the resonance power source,
Qt represents a resonance characteristic value of the power transfer coil, and
Qr represents a resonance characteristic value of the power receiving device.

* * * * *